(12) United States Patent
Ichikawa

(10) Patent No.: US 11,719,552 B2
(45) Date of Patent: Aug. 8, 2023

(54) INFORMATION PROVIDING APPARATUS AND VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 859 days.

(21) Appl. No.: 16/694,527

(22) Filed: Nov. 25, 2019

(65) Prior Publication Data

US 2020/0166357 A1 May 28, 2020

(30) Foreign Application Priority Data

Nov. 27, 2018 (JP) ................. 2018-220969

(51) Int. Cl.
*G01C 21/36* (2006.01)
*B60L 53/18* (2019.01)

(52) U.S. Cl.
CPC .......... *G01C 21/3673* (2013.01); *B60L 53/18* (2019.02); *G01C 21/3679* (2013.01); *B60L 2240/60* (2013.01)

(58) Field of Classification Search
CPC ........................... B60L 53/18; B60L 2240/60
USPC .......................................................... 701/22
See application file for complete search history.

(56) References Cited

U.S. PATENT DOCUMENTS

2013/0261953 A1 10/2013 Kiyama et al.
2014/0179164 A1 6/2014 Kanamori et al.
2014/0371969 A1* 12/2014 Asai .................. B60L 53/31
 701/22
2017/0368953 A1 12/2017 Zech et al.
2018/0065496 A1* 3/2018 Reynolds ............. B60L 53/305
2018/0143035 A1* 5/2018 Ricci .................. G06Q 30/0266

FOREIGN PATENT DOCUMENTS

| JP | 2011-083166 A | 4/2011 | |
|---|---|---|---|
| JP | 2011-221955 A | 11/2011 | |
| JP | 2013-210281 A | 10/2013 | |
| JP | 2014-140289 A | 7/2014 | |
| JP | 2013136447 | * 8/2015 | ............. G01C 21/36 |
| JP | 2017-229230 A | 12/2017 | |

* cited by examiner

*Primary Examiner* — Thomas Randazzo
*Assistant Examiner* — Michael E Butler
(74) *Attorney, Agent, or Firm* — Dinsmore & Shohl LLP

(57) ABSTRACT

An information providing apparatus is configured to be used in a target vehicle and display power feeding facilities on a map, the target vehicle being configured such that a vehicle-mounted battery can be charged with DC power supplied from outside the target vehicle. The information providing apparatus is configured to display an electrical outlet-type AC stand on the map in a manner of being distinguished from a cable-equipped AC stand, when the target vehicle is a vehicle not including an AC charger and a prescribed first condition is satisfied. In contrast, the information providing apparatus is configured to display the electrical outlet-type AC stand and the cable-equipped AC stand on the map without distinguishing between the electrical outlet-type AC stand and the cable-equipped AC stand, when the target vehicle is a vehicle including the AC charger and a prescribed second condition is satisfied.

6 Claims, 20 Drawing Sheets

INFORMATION PROVIDING APPARATUS AND VEHICLE

CROSS REFERENCE TO RELATED APPLICATIONS

This nonprovisional application claims priority to Japanese Patent Application No. 2018-220969 filed on Nov. 27, 2018 with the Japan Patent Office, the entire contents of which are hereby incorporated by reference.

BACKGROUND

Field

The present disclosure relates to an information providing apparatus and a vehicle.

Description of the Background Art

Japanese Patent Laying-Open No. 2011-221955 discloses an information providing apparatus configured to display power feeding facilities on a map. The information providing apparatus is configured to specify a power feeding facility that is being used by a vehicle and a vehicle that may use a power feeding facility, based on information collected from a plurality of power feeding facilities and a plurality of vehicles, and provide information (a current status of use, a prospect for becoming available, and a prospect for use) about the use of the power feeding facilities to a requesting vehicle that requests the information.

SUMMARY

Generally, power feeding facilities are roughly classified into an AC power feeding facility (hereinafter, also referred to as "AC stand") and a DC power feeding facility (hereinafter, also referred to as "DC stand"). Typical examples of the AC stand include a normal charger. Typical examples of the DC stand include a quick charger. In order to allow a vehicle to use both the AC stand and the DC stand, it is required to mount a charging module (e.g., a charger and an inlet) adapted to each stand on the vehicle.

However, an increase in the number and type of vehicle-mountable equipment has not only advantages but also disadvantages. Examples of the disadvantages include an increase in vehicle weight and an increase in vehicle cost. In order to suppress such disadvantages, it is conceivable to make a vehicle-mountable charging module optional. There is a possibility that a vehicle type in which an optional charging module (i.e., a user can select whether or not to add the charging module) is set in addition to a charging module included as standard (hereinafter, also referred to as "standard charging module") will appear in the future.

For example, there is a possibility that a vehicle type (hereinafter, also referred to as "AC option vehicle") in which a charging module adapted to a DC stand (hereinafter, also referred to as "DC charging module") is set as a standard charging module and a charging module adapted to an AC stand (hereinafter, also referred to as "AC charging module") is set as an optional charging module will appear. In preparation for the appearance of the AC option vehicle, it is required to provide an information providing apparatus suitable for the AC option vehicle. A general car navigation system displays all AC stands on a map without distinguishing between the AC stands. However, such a manner of display may be undesirable for the AC option vehicle from the perspective of the user convenience.

The present disclosure has been made to solve the above-described problem, and an object of the present disclosure is to provide an information providing apparatus configured to display AC power feeding facilities with improved user convenience in an AC option vehicle, and a vehicle including the information providing apparatus.

An information providing apparatus according to a first aspect of the present disclosure is configured to be used in a target vehicle and display power feeding facilities on a map, the target vehicle including a battery configured to be charged with DC power supplied from outside the target vehicle. The information providing apparatus according to the first aspect of the present disclosure includes a controller configured to cause a display device to display the map. The controller includes: a first display unit; and a second display unit. The first display unit is configured to control the display device to display a first AC power feeding facility on the map in a manner of being distinguished from a second AC power feeding facility, when the target vehicle is a vehicle not including an AC charger (hereinafter, also referred to as "first vehicle") and a prescribed first condition is satisfied. The second display unit is configured to control the display device to display the first AC power feeding facility and the second AC power feeding facility on the map without distinguishing between the first AC power feeding facility and the second AC power feeding facility, when the target vehicle is a vehicle including the AC charger (hereinafter, also referred to as "second vehicle") and a prescribed second condition is satisfied. The AC charger is a vehicle-mountable charger configured to convert AC power supplied from outside the target vehicle into DC power and supply the DC power to the battery when the target vehicle is the second vehicle. The first AC power feeding facility is an AC power feeding facility including an electrical outlet for AC power connectable to a plug of a charging cable. The second AC power feeding facility is an AC power feeding facility including a charging cable connectable to an inlet for AC power of a vehicle.

When an AC option vehicle becomes widely used, a charging cable that allows a vehicle not including an AC charging module (i.e., a vehicle in which mounting of an AC charging module is not selected) to use AC stands may be provided. However, even if such a charging cable is provided, there is a high possibility that the vehicle not including the AC charging module can only use a part of the AC stands. In view of the effective use of the existing AC stands, the AC stand that becomes usable by the above-described charging cable may be an electrical outlet-type AC stand (i.e., an AC power feeding facility including an electrical outlet for AC power connectable to a plug of the above-described charging cable). In contrast, a vehicle including an AC charging module can highly possibly use all AC stands.

The above-described information providing apparatus is configured to display the first AC power feeding facility on the map in the manner of being distinguished from the second AC power feeding facility, when the target vehicle is the first vehicle (i.e., the vehicle not including the AC charger) and the first condition is satisfied. With such display, the user can identify the first AC power feeding facility (and further, the electrical outlet-type AC stand) on the map.

The first condition can be arbitrarily set. The first condition may be constantly satisfied, or may be satisfied when an input device receives a prescribed first input from the user, or may be satisfied only when it is particularly requested to distinguish between and display the first AC power feeding facility and the second AC power feeding facility.

However, in the case where the AC power feeding facilities are distinguished from each other by type and displayed on the map, it is difficult to identify the AC power feeding facilities when looking for the AC power feeding facilities from among the power feeding facilities on the map. The above-described information providing apparatus is configured to display the first AC power feeding facility and the second AC power feeding facility on the map without distinguishing between the first AC power feeding facility and the second AC power feeding facility, when the target vehicle is the second vehicle (i.e., the vehicle including the AC charger) and the second condition is satisfied. With such display, the user can easily identify the AC power feeding facilities on the map.

The second condition can be arbitrarily set. The second condition may be constantly satisfied, or may be satisfied when the input device receives a prescribed second input from the user, or may be satisfied when the necessity for distinguishing between and displaying the first AC power feeding facility and the second AC power feeding facility is particularly low.

Displaying the first AC power feeding facility on the map in the manner of being distinguished from the second AC power feeding facility includes displaying the first and second AC power feeding facilities on different maps, and displaying only the first AC power feeding facility on the map, in addition to displaying the first and second AC power feeding facilities on the same map in the manner of distinguishing between the first and second AC power feeding facilities.

An information providing apparatus according to a second aspect of the present disclosure is configured to be used in a target vehicle and display power feeding facilities on a map, the target vehicle including a battery configured to be charged with DC power supplied from outside the target vehicle. The information providing apparatus according to the second aspect of the present disclosure includes a controller configured to cause a display device to display the map. The controller is configured to control the display device to display the first AC power feeding facility and not to display the second AC power feeding facility, when the target vehicle is a first vehicle (i.e., a vehicle not including an AC charger) and a prescribed first condition is satisfied. According to such an information providing apparatus, the AC power feeding facilities can be displayed with improved user convenience in an AC option vehicle.

The target vehicle may be a vehicle having the above-described information providing apparatus mounted thereon. In such a configuration that the above-described information providing apparatus is mounted on a mobile device such as a smartphone, any vehicle can be set as the target vehicle in the information providing apparatus. The information providing apparatus in which the target vehicle is set provides information about the target vehicle. The information providing apparatus may include the display device and may be configured to cause the display device to display the map around the target vehicle and display the power feeding facilities on the map.

In the above-described information providing apparatus, the controller may further include a third determination unit configured to determine whether or not the AC charger is mounted on the target vehicle. The third determination unit may be configured to determine whether or not the AC charger is mounted on the target vehicle, after the information providing apparatus is mounted on the target vehicle. Information indicating whether or not the AC charger is mounted on the target vehicle may be input to the above-described information providing apparatus by default setting (e.g., setting at the time of factory shipment). When such default setting is made, the above-described information providing apparatus need not determine whether or not the AC charger is mounted on the target vehicle.

In the above-described information providing apparatus, the controller may further include a first determination unit configured to determine whether or not a first charging cable described below is mounted on the target vehicle. The first charging cable includes: an AC plug connectable to the electrical outlet for AC power; a DC connector connectable to an inlet for DC power of a vehicle; and a power conversion circuit configured to convert AC power input from the AC plug side into DC power and output the DC power to the DC connector side. The prescribed first condition may be satisfied when the first determination unit determines that the first charging cable is mounted on the target vehicle. The first display unit may be configured to control the display device not to display all of the AC power feeding facilities on the map, when the target vehicle is the first vehicle and the prescribed first condition is not satisfied.

Hereinafter, a vehicle not including the AC charger and the first charging cable will be referred to as "non-AC vehicle". There is a high possibility that the non-AC vehicle cannot use the AC stands. According to the above-described information providing apparatus, the AC stands (AC power feeding facilities) are not displayed on the map, when the target vehicle is the non-AC vehicle. This inhibits the target vehicle from heading for an unusable power feeding facility. Hereinafter, the first charging cable will be referred to as "AC/DC conversion cable".

In the above-described information providing apparatus, the prescribed first condition is satisfied when the first determination unit determines that the first charging cable is mounted on the target vehicle. In the above-described information providing apparatus, the first display unit may be configured to control the display device to display the first AC power feeding facility of the AC power feeding facilities on the map and not to display the second AC power feeding facility of the AC power feeding facilities on the map, when the target vehicle is the first vehicle and the prescribed first condition is satisfied.

Hereinafter, a vehicle not including the AC charger but including the AC/DC conversion cable will be referred to as "conversion-type AC vehicle". The AC/DC conversion cable allows the conversion-type AC vehicle to use the first AC power feeding facility. According to the above-described information providing apparatus, the target vehicle can be guided to the first AC power feeding facility, when the target vehicle is the conversion-type AC vehicle.

In the above-described information providing apparatus, the controller may further include a first notification unit configured to detect a position of the first charging cable in the target vehicle and cause the display device (i.e., the display device controlled by the first display unit) or another notification device to provide a notification of the detected position of the first charging cable, when the first charging cable is mounted on the target vehicle (i.e., when the first condition is satisfied). According to such a configuration, the user's time and effort required to look for the first charging cable can be reduced.

In such a configuration that the first notification unit causes the notification device (i.e., a notification device other than the display device) to provide the notification of the position of the first charging cable, the display device may be a display device mounted on the target vehicle and the notification device may be a mobile device carried by the user. Alternatively, the display device may be a display device of a navigation system mounted on the target vehicle and the notification device may be a meter panel mounted on the target vehicle. Any method may be used as a notification method by the first notification unit, and the notification may be provided by display, or may be provided by sound (including voice).

In the above-described information providing apparatus, the controller may further include a second determination unit configured to determine whether or not a second charging cable described below is mounted on the target vehicle. The second charging cable includes: an AC plug connectable to the electrical outlet for AC power; and an AC connector connectable to the inlet for AC power of a vehicle. The second condition may be satisfied when the second determination unit determines that the second charging cable is mounted on the target vehicle.

There is a particularly high possibility that a vehicle including both the AC charger and the second charging cable can use both the first AC power feeding facility and the second AC power feeding facility. In such a vehicle, by displaying the first AC power feeding facility and the second AC power feeding facility without distinguishing between the first AC power feeding facility and the second AC power feeding facility, the user can easily identity the AC power feeding facilities on the map. Hereinafter, the second charging cable will be referred to as "AC outlet cable".

In the above-described information providing apparatus, the prescribed second condition is satisfied when the second determination unit determines that the second charging cable is mounted on the target vehicle. In the above-described information providing apparatus, the second display unit may be configured to display the second AC power feeding facility of the AC power feeding facilities on the map and not to display the first AC power feeding facility of the AC power feeding facilities on the map, when the target vehicle is the second vehicle and the second condition is not satisfied.

Hereinafter, a vehicle including the AC charger and not including the AC outlet cable will be referred to as "non-AC outlet vehicle". The non-AC outlet vehicle includes the AC charger, and thus, there is a high possibility that the non-AC outlet vehicle can use the second AC power feeding facility. However, the non-AC outlet vehicle does not include the AC outlet cable, and thus, there is a low possibility that the non-AC outlet vehicle can use the first AC power feeding facility. According to the above-described information providing apparatus, the target vehicle can be guided to the second AC power feeding facility, when the target vehicle is the non-AC outlet vehicle.

In the above-described information providing apparatus, the controller may further include a second notification unit configured to detect a position of the second charging cable in the target vehicle and cause the display device (i.e., the display device controlled by the second display unit) or another notification device to provide a notification of the detected position of the second charging cable, when the second charging cable is mounted on the target vehicle (i.e., when the second condition is satisfied). According to such a configuration, the user's time and effort required to look for the second charging cable can be reduced.

In such a configuration that the second notification unit causes the notification device (i.e., a notification device other than the display device) to provide the notification of the position of the second charging cable, the display device may be a display device mounted on the target vehicle and the notification device may be a mobile device carried by the user. Alternatively, the display device may be a display device of a navigation system mounted on the target vehicle and the notification device may be a meter panel mounted on the target vehicle. Any method may be used as a notification method by the second notification unit, and the notification may be provided by display, or may be provided by sound (including voice).

A vehicle according to the present disclosure includes: any one of the information providing apparatuses described above; and an inlet for DC power.

In such a vehicle, even when the AC charger (and further, the inlet for AC power) is made optional, the above-described information providing apparatus makes it possible to display the AC power feeding facilities with improved user convenience.

The foregoing and other objects, features, aspects and advantages of the present disclosure will become more apparent from the following detailed description of the present disclosure when taken in conjunction with the accompanying drawings.

DETAILED DESCRIPTION

Figure 1:
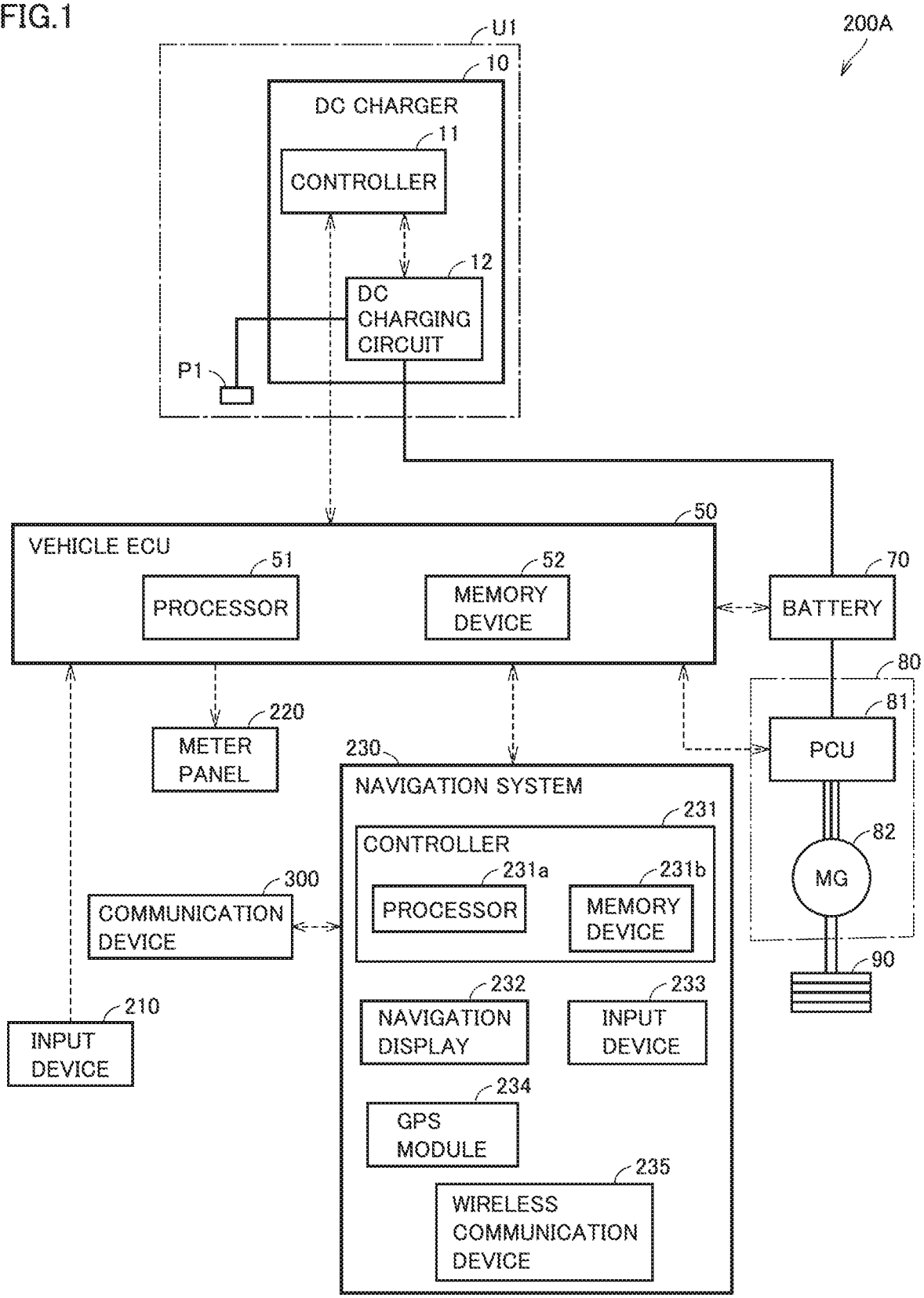
FIG. 1 shows a configuration when an AC charging module (optional charging module) is not added in a vehicle according to a first embodiment of the present disclosure.

Embodiments of the present disclosure will be described in detail with reference to the drawings, in which the same or corresponding portions are denoted by the same reference characters and description thereof will not be repeated.

First Embodiment

In a vehicle having an information providing apparatus according to the present embodiment mounted thereon, a charging module including a vehicle-mountable charger and an inlet is made optional. In the vehicle, a charging module for DC power (DC charging module) is set as a standard charging module, and a charging module for AC power (AC charging module) is set as an optional charging module. That is, the vehicle has the DC charging module and is configured to allow a user to select whether or not to mount the AC charging module thereon. The user can select whether or not to add the AC charging module to the vehicle, when purchasing the vehicle. The user can also retrofit the AC charging module to the vehicle after purchasing the vehicle. Description will be given below of an example in which the vehicle is a plug-in hybrid vehicle. However, the applicable range of the information providing apparatus is not limited to the plug-in hybrid vehicle and the information providing apparatus may be applied to an electric vehicle not having an engine mounted thereon. Hereinafter, an electronic control unit will be referred to as "ECU".

Figure 2:
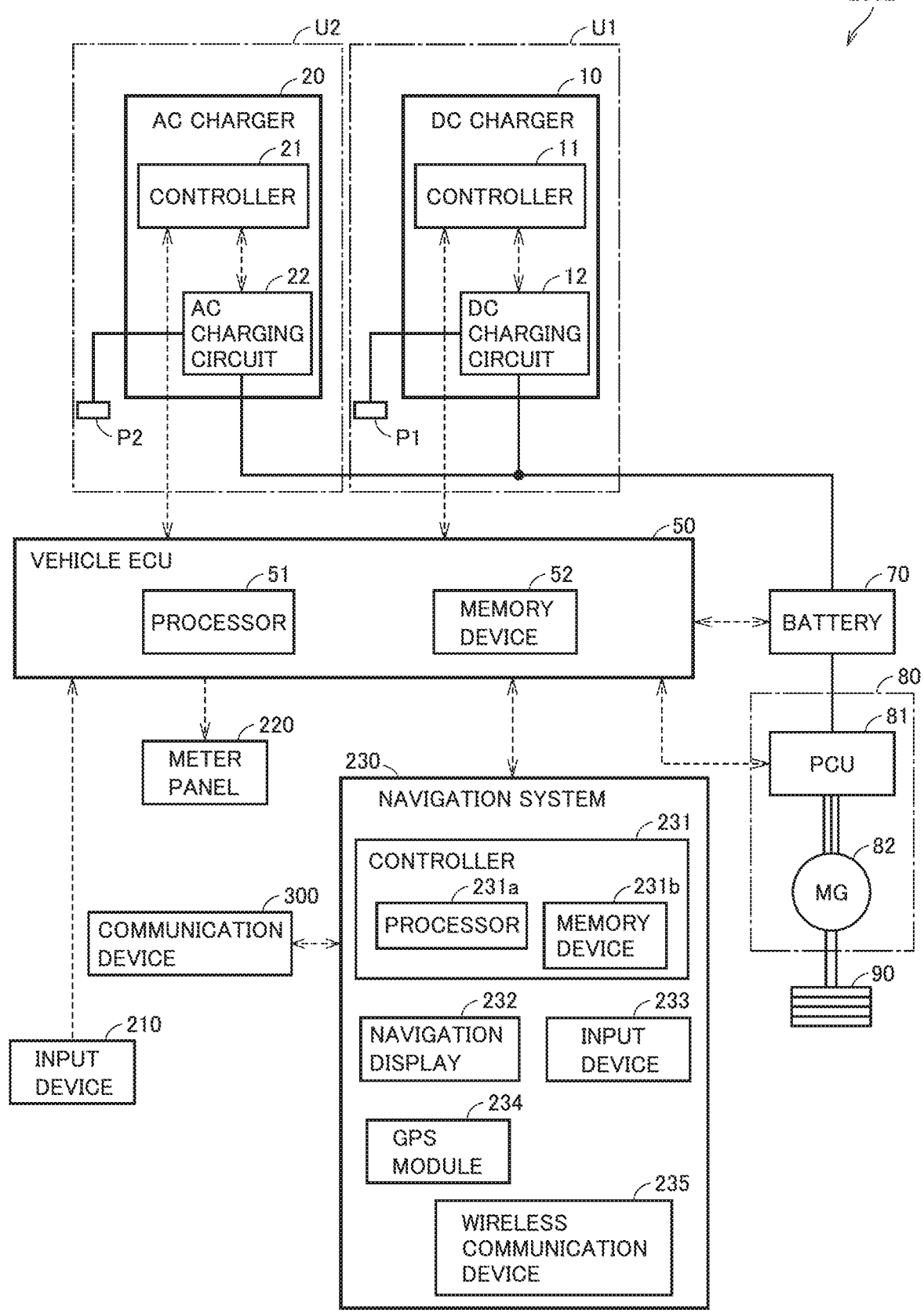
FIG. 2 shows a configuration when the AC charging module (optional charging module) is added in the vehicle according to the first embodiment.

FIG. 1 shows a configuration when the AC charging module (optional charging module) is not added in the vehicle according to the present embodiment. FIG. 2 shows a configuration when the AC charging module (optional charging module) is added in the vehicle according to the present embodiment. FIGS. 1 and 2 mainly show a charging path of a vehicle-mounted battery in the vehicle. Hereinafter, the vehicle to which the AC charging module is not added will be referred to as "vehicle 200A" and the vehicle to which the AC charging module is added will be referred to as "vehicle 200B".

Referring to FIG. 1, vehicle 200A includes a DC charging module U1, a vehicle ECU 50, a battery 70, a travel driving device 80, a driving wheel 90, an input device 210, a meter panel 220, and a navigation system 230. Travel driving device 80 includes a PCU (Power Control Unit) 81 and an MG (Motor Generator) 82, and is configured to cause vehicle 200A to travel using electric power stored in battery 70. Each of DC charging module U1, travel driving device 80, meter panel 220, and navigation system 230 is controlled by vehicle ECU 50.

Vehicle ECU 50 includes a processor 51 and a memory device 52. A CPU (Central Processing Unit) can, for example, be used as processor 51. Memory device 52 includes a RAM (Random Access Memory) configured to temporarily store data, and a storage (e.g., a ROM (Read Only Memory) and a rewritable nonvolatile memory) configured to save various types of information. In addition to programs used in various types of control, various parameters used in the programs are also prestored in the storage. Processor 51 executes the programs stored in memory device 52 and the various types of control are thereby performed. The various types of control can be processed not only by software but also by dedicated hardware (electronic circuit).

Input device 210 is a device configured to receive an input from the user. Input device 210 is operated by the user and outputs a signal corresponding to the operation by the user to vehicle ECU 50. A communication method may be wired or wireless. Examples of input device 210 include various switches, various pointing devices, and a touch panel.

Meter panel 220 is provided on an instrument panel (more particularly, near a windshield) in a vehicle cabin of vehicle 200A and configured to display prescribed information in accordance with an instruction from vehicle ECU 50. Meter panel 220 may be configured to display basic information (e.g., a travel speed, an outdoor air temperature, a remaining amount of fuel of an engine, an SOC (State Of Charge) of battery 70, a travel distance, a fuel consumption, and an electric mileage) about traveling of vehicle 200A. Meter panel 220 may also be configured to display various types of information (e.g., a state of operation of the vehicle system, and history information about the fuel consumption and the electric mileage) for convenient use of vehicle 200A.

Navigation system 230 is configured to display power feeding facilities (e.g., AC stands and DC stands) on a map. Navigation system 230 is also configured to perform route search for finding an optimum route (e.g., a shortest route) from a current position of vehicle 200A to a destination, and display the optimum route found by the route search on the map. Navigation system 230 may have a speaker function and be configured to guide vehicle 200A by sound (including voice).

Navigation system 230 includes a controller 231, a display (hereinafter, referred to as "navigation display") 232, an input device 233, a GPS (Global Positioning System) module 234, and a wireless communication device 235. Navigation system 230 according to the present embodiment corresponds to one example of "information providing apparatus" according to the present disclosure. Controller 231 and navigation display 232 according to the present embodiment correspond to one example of "controller" and "display device" according to the present disclosure, respectively.

Controller 231 includes a processor 231a and a memory device 231b. A CPU can, for example, be used as processor 231a. Memory device 231b includes a RAM configured to temporarily store data, and a storage (e.g., a ROM and a hard disk) configured to save various types of information. A control program and a map database are prestored in the storage. The map database includes information (e.g., positions and specifications) about the power feeding facilities. Controller 231 according to the present embodiment includes "first display unit" and "second display unit"

according to the present disclosure. Controller 231 further includes "third determination unit". For example, "first display unit", "second display unit" and "third determination unit" described above are implemented by processor 231*a* and the program in memory device 231*b* executed by processor 231*a*. However, the present disclosure is not limited to such a configuration. Each of these units may be implemented by dedicated hardware (electronic circuit).

Navigation display 232 is configured to display information (e.g., the map, the power feeding facilities and the optimum route) in accordance with an instruction from controller 231. Controller 231 is configured to cause navigation display 232 to display the map around vehicle 200A.

Input device 233 is a device configured to receive an input from the user. Input device 233 is operated by the user and outputs a signal corresponding to the operation by the user to controller 231. A communication method may be wired or wireless. Various switches (such as a push button switch and a slide switch), various pointing devices (such as a mouse and a touch pad), a keyboard, and a touch panel can be used as input device 233. The user can operate input device 233 to input the destination in the above-described route search to controller 231, for example. The information about the power feeding facilities may be added to the above-described map database in accordance with the input from the user to input device 233. Controller 231 may be configured to execute the control program based on the input from the user to input device 233, to thereby perform the above-described route search and cause navigation display 232 to display the search result.

GPS module 234 includes a reception device configured to receive a signal (hereinafter, referred to as "GPS signal") from a GPS satellite. Controller 231 can identify the current position of vehicle 200A using the GPS signal. Any method may be used as a method for detecting the current position of vehicle 200A. For example, controller 231 may calculate the current position of vehicle 200A using an output from a gyrosensor (not shown) configured to detect rotation (change in orientation) of vehicle 200A, in addition to the GPS signal.

Wireless communication device 235 is a communication device configured to wirelessly communicate with the outside. Controller 231 can wirelessly communicate with a communication device 300 through wireless communication device 235. Controller 231 can also access a communication network through wireless communication device 235 and receive various types of information from a data center (not shown) in the communication network. More specifically, the latest map information is transmitted from the data center to navigation system 230 as needed, and controller 231 updates the above-described map database using the received map information.

Communication device 300 may include at least one of a mobile device and a wireless tag present in the vehicle cabin of vehicle 200A. Examples of the mobile device include an information terminal having a small-sized computer built therein, such as a smartphone, a smartwatch, a laptop computer, a tablet terminal, and a portable game console. Examples of the wireless tag include an IC tag of RFID (Radio Frequency IDentification).

Vehicle ECU 50 and navigation system 230 are connected to communicate with each other. Vehicle ECU 50 can obtain the information (e.g., the map information and the current position of vehicle 200A) from navigation system 230.

The input devices (e.g., input devices 210 and 233) operated by the user are placed, for example, at a position where the user sitting in a driver's seat in the vehicle cabin of vehicle 200A can operate the input devices. The display devices (e.g., meter panel 220, and navigation display 232 of navigation system 230) configured to display the information to the user are placed, for example, at a position where the user sitting in the driver's seat in the vehicle cabin of vehicle 200A can visually recognize the display devices.

DC charging module U1 is a charging module adapted to the DC stand (power feeding facility for the DC method), and includes a DC charger 10 and a DC inlet P1.

DC inlet P1 is a charging port (inlet for DC power) adapted to the DC stand. When a connector of a charging cable connected to the DC stand is connected to DC inlet P1, DC inlet P1 can receive DC power supplied from the DC stand through the charging cable. The DC power supplied to DC inlet P1 is input to DC charger 10.

DC charger 10 includes a controller 11 and a DC charging circuit 12. Controller 11 basically has the same hardware configuration as that of above-described vehicle ECU 50. That is, controller 11 also includes a processor and a memory device (both are not shown). DC charging circuit 12 includes, for example, a circuit configured to perform prescribed processing on the DC power input to DC inlet P1, and various sensors configured to detect a state (e.g., a temperature, a current and a voltage) of each portion (all are not shown). DC charging circuit 12 may include a power conversion circuit (e.g., a DC/DC converter), or may include a filter circuit. As a result of such processing by the circuit, electric power (DC power) suitable for charging of battery 70 is output from DC charging circuit 12 to battery 70. A result of detection by the sensors indicating the state of each portion in DC charging circuit 12 is output to controller 11, and then, is transmitted from controller 11 to vehicle ECU 50.

Battery 70 is a driving battery configured to store electric power for electrically powered traveling, and is charging-controlled by vehicle ECU 50. Although not shown, vehicle 200A further includes an engine (internal combustion engine). Vehicle 200A is a hybrid vehicle that can travel using both the electric power stored in battery 70 and an output of the engine (not shown). The kinetic energy generated by the engine is used for driving of driving wheel 90. A PCU 81 can perform power running driving of MG 82 using the electric power of battery 70 to thereby rotate driving wheel 90.

Battery 70 includes a secondary battery such as a lithium ion battery or a nickel-metal hydride battery, a charging relay controlled to be turned on and off by vehicle ECU 50, an SMR (system main relay) controlled to be turned on and off by vehicle ECU 50, and a monitoring module configured to monitor a state of battery 70 (all are not shown). The monitoring module includes various sensors configured to detect the state (e.g., a temperature, a current and a voltage) of battery 70, and outputs a result of detection to vehicle ECU 50. The charging relay is turned on when battery 70 is charged by an external power supply (power supply external to vehicle 200A). The SMR is turned on when vehicle 200A travels using the electric power of battery 70. Vehicle ECU 50 obtains the state (e.g., the temperature, the current, the voltage, and the SOC) of battery 70 based on the output from the monitoring module (detection values of various sensors).

Battery 70 supplies electric power for driving driving wheel 90 by MG 82 to PCU 81. MG 82 is a rotating electric machine and is, for example, a three-phase AC motor generator. MG 82 is driven by PCU 81 and rotates driving wheel 90. MG 82 can also perform regenerative power generation during deceleration or braking of vehicle 200A.

PCU 81 includes a controller including a processor (e.g., a CPU), an inverter and a converter (all are not shown). The controller of PCU 81 is configured to receive an instruction (control signal) from vehicle ECU 50 and control the inverter and the converter of PCU 81 in accordance with the instruction. During power running driving of MG 82, PCU 81 converts the electric power stored in battery 70 into AC power and supplies the AC power to MG 82. During power generation by MG 82, PCU 81 rectifies the generated electric power and supplies the rectified electric power to battery 70.

Next, a configuration of vehicle 200B will be described with reference to FIG. 2. However, description of the features common to vehicles 200A and 200B will not be repeated. Referring to FIG. 2, vehicle 200B is configured such that an AC charging module U2 is added to vehicle 200A (FIG. 1). AC charging module U2 is a charging module adapted to the AC stand (power feeding facility for the AC method), and includes an AC inlet P2 and an AC charger 20.

AC inlet P2 is a charging port (inlet for AC power) adapted to the AC stand. When a connector of a charging cable connected to the AC stand is connected to AC inlet P2, AC inlet P2 can receive AC power supplied from the AC stand through the charging cable. The AC power supplied to AC inlet P2 is input to AC charger 20.

AC charger 20 is configured to convert AC power supplied from outside vehicle 200B into DC power in vehicle 200B and supply the DC power to the vehicle-mounted battery (e.g., battery 70). AC charger 20 according to the present embodiment corresponds to one example of "AC charger" according to the present disclosure. AC charger 20 includes a controller 21 and an AC charging circuit 22. Controller 21 basically has the same hardware configuration as that of above-described vehicle ECU 50. That is, controller 21 also includes a processor and a memory device (both are not shown). AC charging circuit 22 includes, for example, circuits (e.g., a filter circuit and a rectifier circuit) configured to perform prescribed processing on the AC power input to AC inlet P2, and various sensors configured to detect a state (e.g., a temperature, a current and a voltage) of each portion (all are not shown). As a result of the above-described processing by the circuit, electric power (DC power) suitable for charging of battery 70 is output from AC charging circuit 22 to battery 70. A result of detection by the sensors indicating the state of each portion in AC charging circuit 22 is output to controller 21, and then, is transmitted from controller 21 to vehicle ECU 50.

General AC stands are broadly classified into an electrical outlet-type AC stand and a cable-equipped AC stand. An electrical outlet-type AC stand and a cable-equipped AC stand according to the present embodiment correspond to one example of "first AC power feeding facility" and "second AC power feeding facility" according to the present disclosure, respectively.

The electrical outlet-type AC stand is an AC power feeding facility including an electrical outlet for AC power connectable to a plug of a charging cable. The above-described electrical outlet for AC power is configured to be connected to a system power supply with a wiring breaker being interposed, for example, and be supplied with AC power from the system power supply. The system power supply is an AC power supply (e.g., a single-phase AC power supply having a voltage of 100 V or 200 V) supplied with electric power from a power grid (e.g., a power grid provided by a power company). Examples of the charging cable including the plug connectable to the above-described electrical outlet for AC power include an AC outlet cable 400 and an AC/DC conversion cable 500 described below (see FIGS. 9 and 10).

The cable-equipped AC stand is an AC power feeding facility including a charging cable connectable to an inlet for AC power (e.g., AC inlet P2) of a vehicle. When a connector of the charging cable of the cable-equipped AC stand is connected to the inlet for AC power of the vehicle, electric power can be supplied from the cable-equipped AC stand to the vehicle through the charging cable.

A general car navigation system displays all AC stands on a map without distinguishing between the AC stands. However, such a manner of display may be undesirable for an AC option vehicle (i.e., a vehicle type in which a DC charging module is set as a standard charging module and an AC charging module is set as an optional charging module), from the perspective of the user convenience.

Navigation system 230 according to the present embodiment can execute control described below, to thereby display the AC stands (AC power feeding facilities) with improved user convenience in both of vehicle 200A not including AC charging module U2 and vehicle 200B including AC charging module U2. Vehicle 200A and vehicle 200B according to the present embodiment correspond to one example of "first vehicle" and "second vehicle" according to the present disclosure, respectively.

Figure 3:
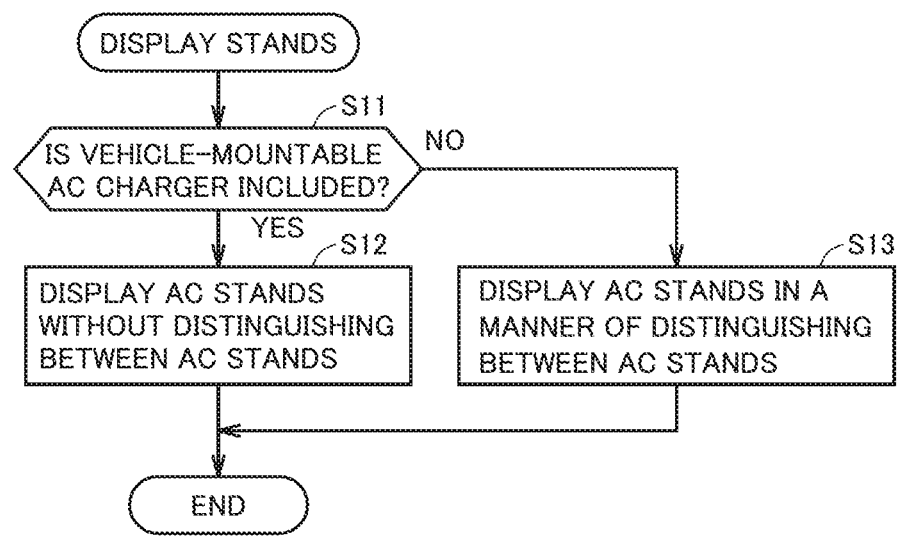
FIG. 3 is a flowchart showing a process procedure for display control executed by an information providing apparatus according to the first embodiment.

FIG. 3 is a flowchart showing a process procedure for display control executed by controller 231 of navigation system 230 according to the present embodiment. The process shown in this flowchart is performed, for example, when the user instructs navigation system 230 to perform the process. Controller 231 determines that an instruction to perform the process is received from the user, when input device 233 receives a prescribed input from the user.

Referring to FIG. 3 together with FIGS. 1 and 2, in step (hereinafter, also simply denoted as "S") 11, controller 231 determines whether or not a target vehicle includes AC charger 20 (vehicle-mountable AC charger). The target vehicle according to the present embodiment is a vehicle (i.e., vehicle 200A shown in FIG. 1 or vehicle 200B shown in FIG. 2) having navigation system 230 mounted thereon. Controller 231 can obtain, from vehicle ECU 50, information indicating whether or not the target vehicle includes AC charger 20. Vehicle ECU 50 requests a response signal to controller 21, for example. When the response signal is not returned, vehicle ECU 50 determines that AC charger 20 is not present. When the response signal is returned, vehicle ECU 50 determines that AC charger 20 is present. The result of determination is output from vehicle ECU 50 to controller 231.

The target vehicle including AC charger 20 means that the target vehicle includes AC charging module U2 (i.e., the target vehicle is vehicle 200B). The target vehicle not including AC charger 20 means that the target vehicle does not include AC charging module U2 (i.e., the target vehicle is vehicle 200A). When it is determined that the target vehicle includes AC charger 20 (YES in S11), controller 231 controls navigation display 232 to display electrical outlet-type AC stands and cable-equipped AC stands on the map without distinguishing between the electrical outlet-type AC stands and the cable-equipped AC stands in S12. In contrast, when it is determined that the target vehicle does not include AC charger 20 (NO in S11), controller 231 controls navigation display 232 to display the electrical outlet-type AC stands on the map in a manner of being distinguished from the cable-equipped AC stands in S13.

Figure 4:
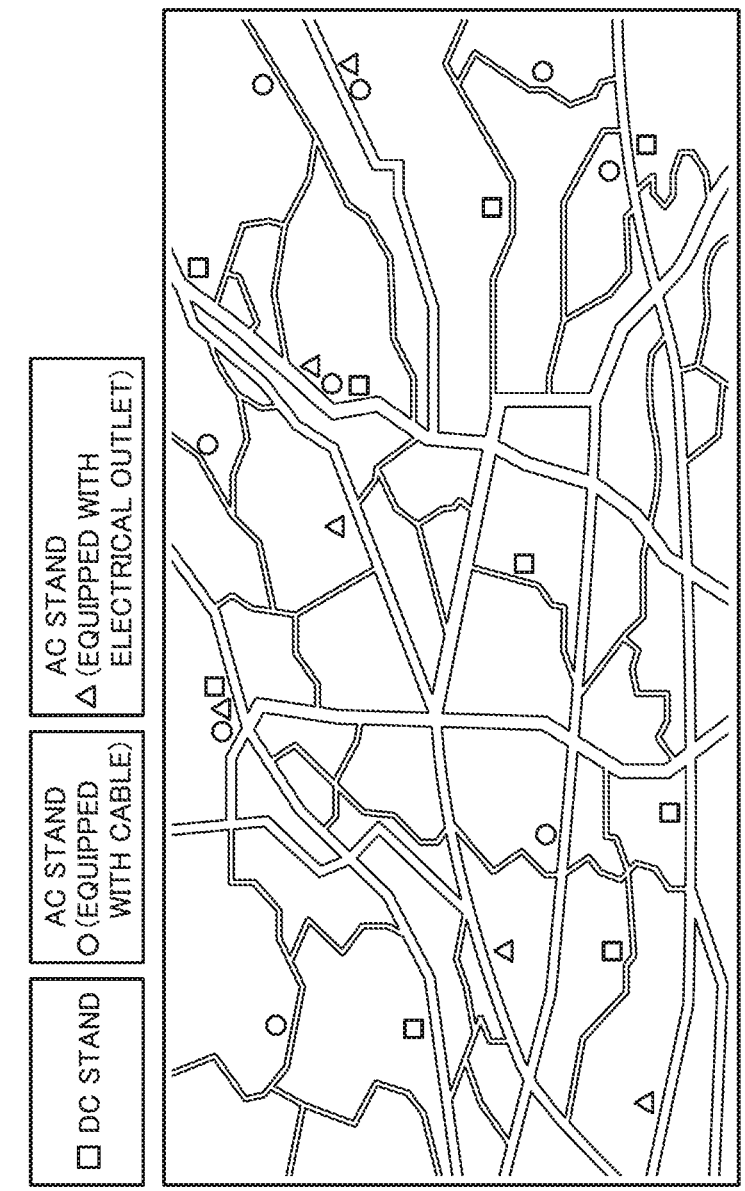
FIG. 4 shows an example in which AC stands are displayed on a map in a manner of distinguishing between electrical outlet-type AC stands (first AC power feeding facilities) and cable-equipped AC stands (second AC power feeding facilities).
Figure 5:
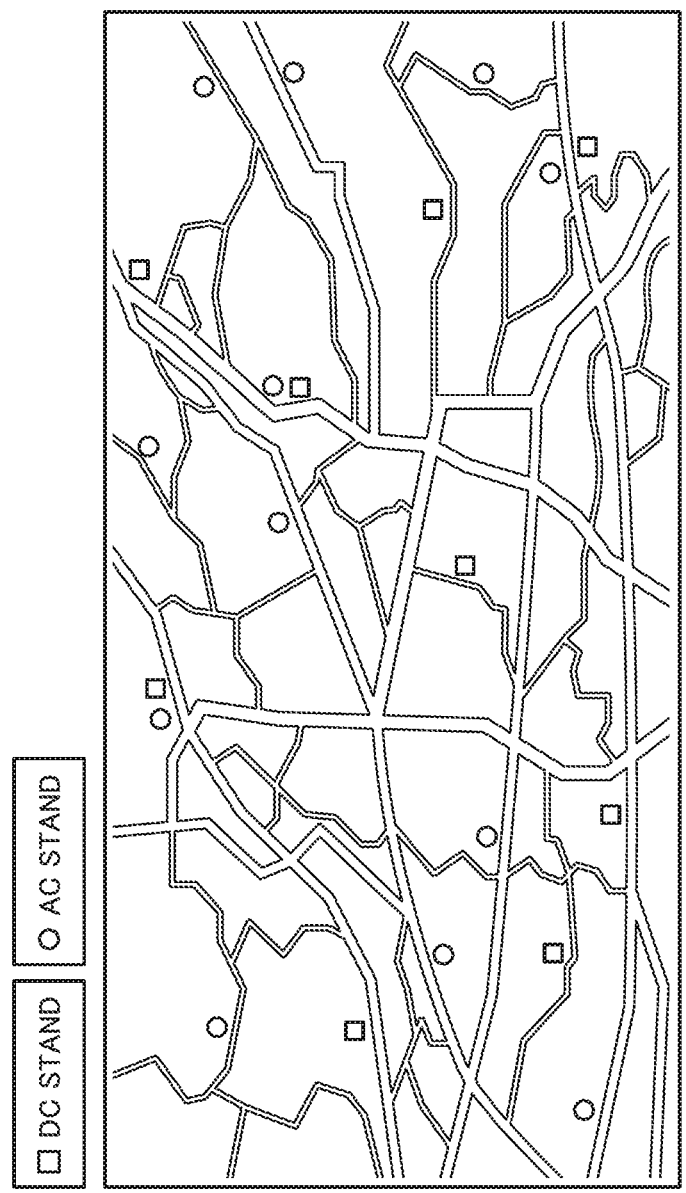
FIG. 5 shows an example in which the AC stands are displayed on the map without distinguishing between the electrical outlet-type AC stands and the cable-equipped AC stands.

FIG. 4 shows an example in which the AC stands are displayed on the map in a manner of distinguishing between the electrical outlet-type AC stands and the cable-equipped AC stands. FIG. 5 shows an example in which the AC stands are displayed on the map without distinguishing between the electrical outlet-type AC stands and the cable-equipped AC stands. The map in each of FIGS. 4 and 5 is a map at the same location. In FIG. 4, "AC stand (equipped with cable)" refers to the cable-equipped AC stand, and "AC stand (equipped with electrical outlet)" refers to the electrical outlet-type AC stand.

Referring to FIG. 4, on this map, the stands are indicated by different shapes to distinguish among the DC stands, the cable-equipped AC stands and the electrical outlet-type AC stands. Each DC stand is indicated by a square mark, each cable-equipped AC stand is indicated by a circular mark, and each electrical outlet-type AC stand is indicated by a triangular mark.

Referring to FIG. 5, on this map, both of the cable-equipped AC stands and the electrical outlet-type AC stands are indicated by circular marks without distinguishing between the cable-equipped AC stands and the electrical outlet-type AC stands. All of the DC stands are indicated by square marks, and all of the AC stands are indicated by circular marks.

A method for distinguishing between the cable-equipped AC stands and the electrical outlet-type AC stands on the map is not limited to the foregoing. At least one of a size and a color, not the shape, of the marks indicating the stands on the map may be changed to distinguish between the cable-equipped AC stands and the electrical outlet-type AC stands on the map. The mark indicating each stand on the map is not limited to the shape such as the circular shape, the triangular shape or the square shape, and may be a numeral, a character, an image (e.g., an icon), or a combination thereof.

As described above, in navigation system 230 according to the present embodiment, controller 231 includes a third determination unit (S11) configured to determine whether or not AC charger 20 is mounted on the target vehicle (and further, whether or not the target vehicle is vehicle 200B). Controller 231 further includes a second display unit (S12) configured to control navigation display 232 to display the electrical outlet-type AC stands and the cable-equipped AC stands on the map without distinguishing between the electrical outlet-type AC stands and the cable-equipped AC stands, when the target vehicle is vehicle 200B (YES in S11). The second display unit is configured to cause navigation display 232 to display the above-described map. In the present embodiment, the second display unit controls navigation display 232 to display the power feeding facilities (more particularly, the DC stands and the AC stands) on the map in the manner shown in FIG. 5 (i.e., without distinguishing between the electrical outlet-type AC stands and the cable-equipped AC stands). Controller 231 further includes a first display unit (S13) configured to display the electrical outlet-type AC stands on the map in the manner of being distinguished from the cable-equipped AC stands, when the target vehicle is vehicle 200A (NO in S11). The first display unit is configured to cause navigation display 232 to display the above-described map. In the present embodiment, the first display unit controls navigation display 232 to display the power feeding facilities (more particularly, the DC stands and the AC stands) on the map in the manner shown in FIG. 4 (i.e., in the manner of distinguishing between the electrical outlet-type AC stands and the cable-equipped AC stands).

Since vehicle 200A does not include AC charging module U2 (AC inlet P2 and AC charger 20), there is a high possibility that vehicle 200A cannot use the AC stands. However, by using an AC/DC conversion cable described below (FIG. 10), vehicle 200A can also use the electrical outlet-type AC stands. Therefore, as for vehicle 200A, in consideration of the possibility of using the AC/DC conversion cable, it is preferable to display the electrical outlet-type AC stands on the map in the manner of being distinguished from the cable-equipped AC stands (see, for example, FIG. 4). With such display, the user can identify the electrical outlet-type AC stands on the map.

In contrast, since vehicle 200B includes AC charging module U2 (AC inlet P2 and AC charger 20), there is a high possibility that vehicle 200B can use the AC stands. Therefore, as for vehicle 200B, it is preferable to display the electrical outlet-type AC stands and the cable-equipped AC stands on the map without distinguishing between the electrical outlet-type AC stands and the cable-equipped AC stands (see, for example, FIG. 5). With such display, the user can easily identify the DC stands and the AC stands on the map.

Second Embodiment

An information providing apparatus and a vehicle according to a second embodiment of the present disclosure will be described. Since the second embodiment has many features common to those of the first embodiment, differences will be mainly described and description of the common features will not be repeated.

Navigation system 230 according to the first embodiment is configured to display the electrical outlet-type AC stands on the map in the manner of being distinguished from the cable-equipped AC stands, when the target vehicle is vehicle 200A and a prescribed first condition is satisfied, and to display the electrical outlet-type AC stands and the cable-equipped AC stands on the map without distinguishing between the electrical outlet-type AC stands and the cable-equipped AC stands, when the target vehicle is vehicle 200B and a prescribed second condition is satisfied. In the first embodiment, each of the first condition and the second condition is constantly satisfied. In contrast, in the second embodiment, the first condition is satisfied when input device 233 receives a prescribed first input.

Figure 6:
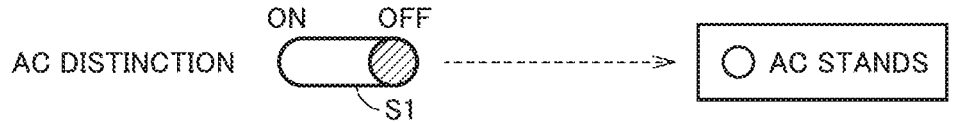
FIG. 6 shows a state in which a first input according to a second embodiment is not received.
Figure 7:
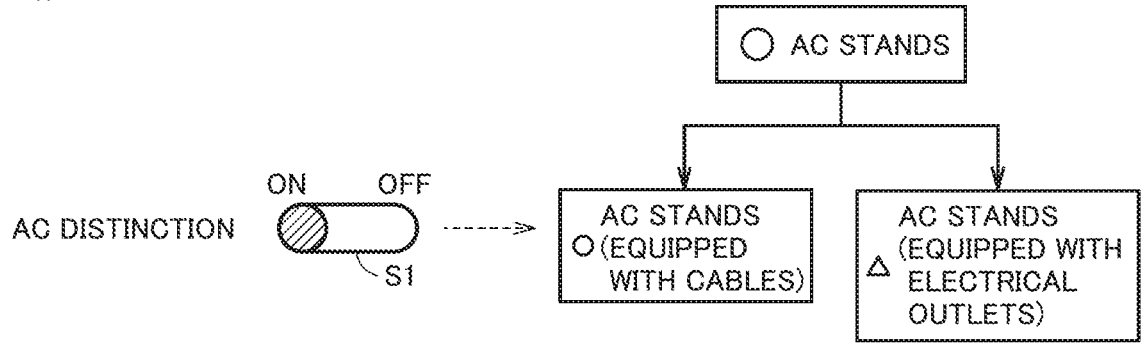
FIG. 7 shows a state in which the first input according to the second embodiment is received.

FIG. 6 shows a state in which the first input according to the present embodiment is not received. FIG. 7 shows a state in which the first input according to the present embodiment is received.

Referring to FIGS. 6 and 7, a switch S1 is a switch included in input device 233, and is operated by the user. The user can either turn on switch S1 or turn off switch S1. Input device 233 according to the present embodiment corresponds to one example of "input device" according to the present disclosure. In the present embodiment, turning on switch S corresponds to one example of "first input" according to the present disclosure. Switch S1 may be displayed on a screen of the display device (e.g., navigation display 232) and operated by the user through a GUI (Graphical User Interface). However, the present disclosure is not limited to such a configuration. Switch S1 may be a physical switch. Although switch S1 shown in FIGS. 6 and 7 is a slide switch, the input device configured to receive the first input from the user may be another switch (e.g., a push button switch).

In the state shown in FIG. 6, switch S1 is in an off state. Switch S1 being in the off state means that input device 233 does not receive the first input (i.e., the first condition is not satisfied). In the second embodiment, when input device 233 does not receive the first input even if the target vehicle is vehicle 200A, the electrical outlet-type AC stands and the cable-equipped AC stands are displayed on the map without distinguishing between the electrical outlet-type AC stands and the cable-equipped AC stands (see, for example, FIG. 5).

In the state shown in FIG. 7, switch S1 is in an on state. Switch S1 being in the on state means that input device 233 receives the first input (i.e., the first condition is satisfied). In the second embodiment, when the target vehicle is vehicle 200A and input device 233 receives the first input, the electrical outlet-type AC stands and the cable-equipped AC stands are displayed on the map in the manner of distinguishing between the electrical outlet-type AC stands and the cable-equipped AC stands (see, for example, FIG. 4).

Figure 8:
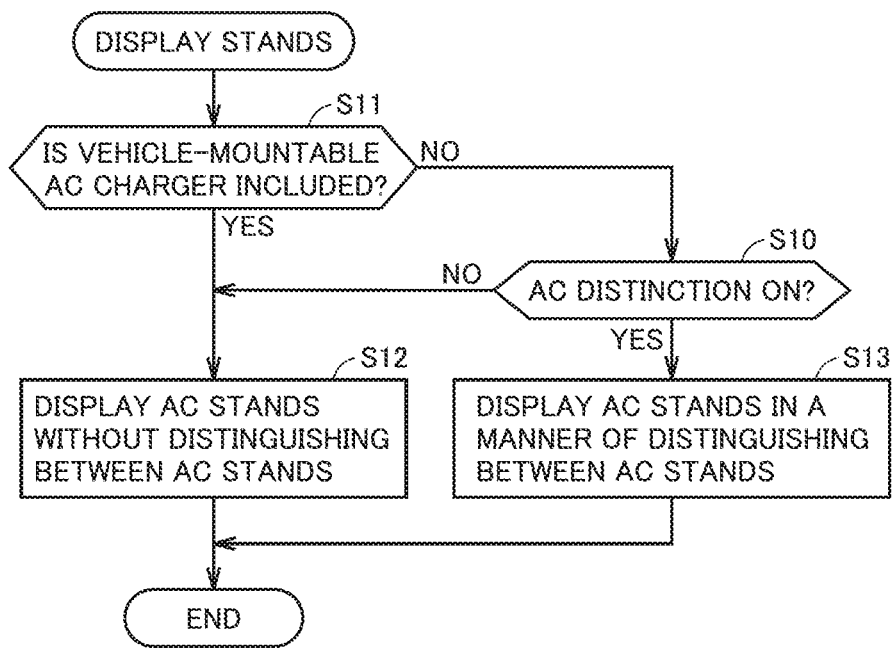
FIG. 8 is a flowchart showing a process procedure for display control executed by an information providing apparatus according to the second embodiment.

Navigation system 230 according to the second embodiment performs a process in FIG. 8, instead of the process in FIG. 3. FIG. 8 is a flowchart showing a process procedure for display control executed by controller 231 of navigation system 230 according to the second embodiment. S11 to S13 in the process in FIG. 8 are the same as S11 to S13 in FIG. 3, respectively. S10 (FIG. 8) added to the process in FIG. 3 will be described below.

Referring to FIG. 8 together with FIGS. 6 and 7, when it is determined in S11 that the target vehicle does not include AC charger 20 (NO in S11), the process proceeds to S10. In S10, controller 231 determines whether or not the user makes a request to display the AC stands in the manner of distinguishing between the AC stands. Hereinafter, a state in which such a request is being issued to navigation system 230 will also be referred to as "AC distinction ON". For example, switch S1 being in the off state shown in FIG. 6 means that navigation system 230 is not in "AC distinction ON". Switch S1 being in the on state shown in FIG. 7 means that navigation system 230 is in "AC distinction ON". Controller 231 checks a state of switch S1, and makes a determination of YES in S10 when switch S1 is in the on state, and makes a determination of NO in S10 when switch S1 is in the off state. For example, a flag indicating the state of switch S1 may be prepared in memory device 231b (FIGS. 1 and 2) and processor 231a may determine whether or not switch S1 is in the on state, based on a value of the flag.

In the process in FIG. 8, when the determination of YES is made in S10, navigation system 230 displays the power feeding facilities (more particularly, the DC stands and the AC stands) on the map in the manner of distinguishing between the electrical outlet-type AC stands and the cable-equipped AC stands in S13. The determination of YES in S10 means that the first condition is satisfied. In contrast, when the determination of NO is made in S10, navigation system 230 displays the power feeding facilities (more particularly, the DC stands and the AC stands) on the map without distinguishing between the electrical outlet-type AC stands and the cable-equipped AC stands in S12. The determination of NO in S10 means that the first condition is not satisfied.

In navigation system 230 according to the present embodiment, the user can select whether or not to display the AC stands in the manner of distinguishing between the AC stands. The user can select an appropriate display mode (AC distinction/AC non-distinction), depending on the situation.

Third Embodiment

An information providing apparatus and a vehicle according to a third embodiment of the present disclosure will be described. Since the third embodiment has many features common to those of the first embodiment, differences will be mainly described and description of the common features will not be repeated.

Navigation system 230 according to the first embodiment is configured to display the electrical outlet-type AC stands on the map in the manner of being distinguished from the cable-equipped AC stands, when the target vehicle is vehicle 200A and the prescribed first condition is satisfied, and to display the electrical outlet-type AC stands and the cable-equipped AC stands on the map without distinguishing between the electrical outlet-type AC stands and the cable-equipped AC stands, when the target vehicle is vehicle 200B and the prescribed second condition is satisfied. In the first embodiment, each of the first condition and the second condition is constantly satisfied. In contrast, in the third embodiment, controller 231 determines whether or not the AC/DC conversion cable is mounted on the target vehicle, and when it is determined that the AC/DC conversion cable is mounted on the target vehicle, the first condition is satisfied. In addition, controller 231 determines whether or not the AC outlet cable is mounted on the target vehicle, and when it is determined that the AC outlet cable is mounted on the target vehicle, the second condition is satisfied.

Figure 9:
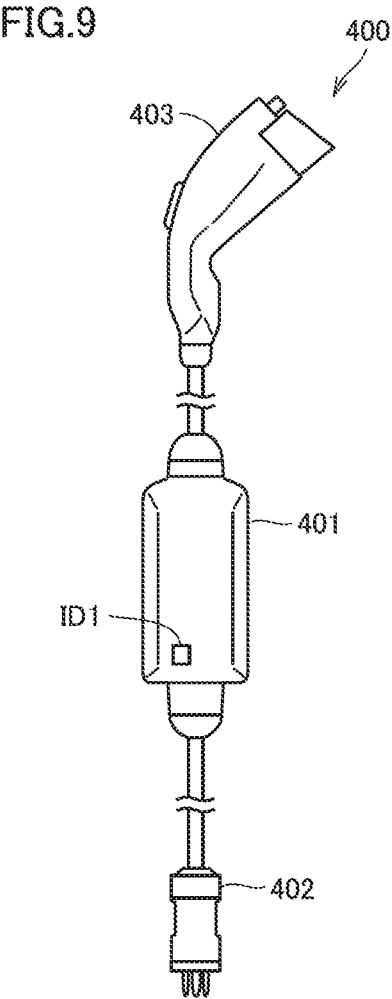
FIG. 9 shows an AC outlet cable (second charging cable) according to a third embodiment.

FIG. 9 shows the AC outlet cable according to the third embodiment. Referring to FIG. 9, an AC outlet cable 400 is a general charging cable used in an electrical outlet-type AC stand. AC outlet cable 400 includes a CCID (Charging Circuit Interrupt Device) box 401, an AC plug 402 and an AC connector 403. AC plug 402 is configured to be connectable to an electrical outlet of an electrical outlet-type AC stand. AC connector 403 is configured to be connectable to AC inlet P2.

A wireless tag ID1 (e.g., an IC tag of RFID) is attached to a prescribed portion (e.g., CCID box 401) of AC outlet cable 400. Wireless tag ID1 sends out ID information (individual identification information). The ID information sent out from wireless tag ID1 is read by, for example, a reader/writer included in wireless communication device 235 (FIGS. 1 and 2). The ID information may be constantly sent out from wireless tag ID1, or may be sent out from wireless tag ID1 in response to a request from the reader/writer. Through wireless communication with wireless tag ID1, controller 231 (FIGS. 1 and 2) can determine whether or not AC outlet cable 400 is present in the target vehicle. Furthermore, when AC outlet cable 400 is present in the target vehicle, controller 231 can specify (detect) a position of AC outlet cable 400 in the target vehicle through wireless communication with wireless tag ID1.

Figure 10:
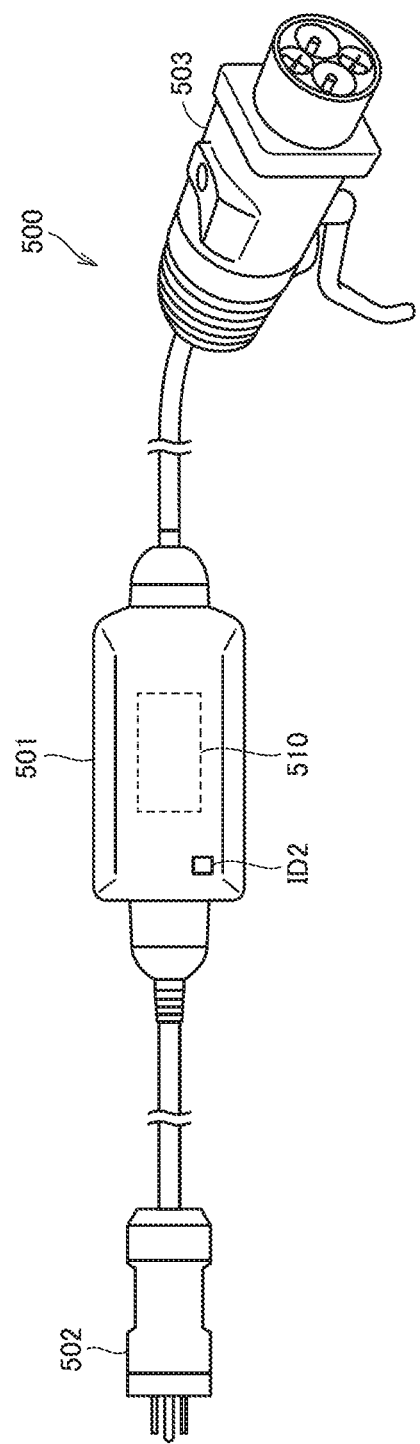
FIG. 10 shows an AC/DC conversion cable (first charging cable) according to the third embodiment.

FIG. 10 shows the AC/DC conversion cable according to the third embodiment. Referring to FIG. 10, an AC/DC conversion cable 500 includes a control box 501, an AC plug 502 and a DC connector 503. AC plug 502 is configured to be connectable to an electrical outlet of an electrical outlet-type AC stand. DC connector 503 is configured to be connectable to DC inlet P1. Control box 501 includes a power conversion circuit 510. Power conversion circuit 510 is configured to convert AC power input from the AC plug 502 side into DC power and output the DC power to the DC connector 503 side.

Figure 11:
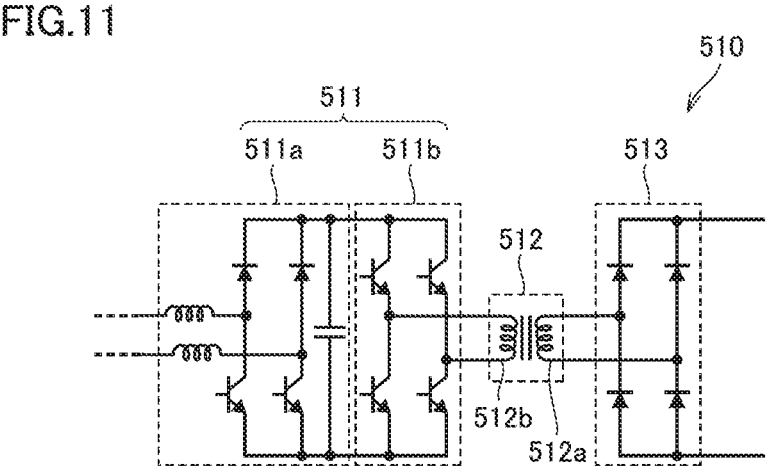
FIG. 11 shows details of a power conversion circuit shown in FIG. 10.

FIG. 11 shows details of power conversion circuit 510. Referring to FIG. 11, power conversion circuit 510 includes a PFC circuit 511, an insulating circuit 512 and a rectifier circuit 513. PFC circuit 511 includes a rectifier circuit 511a and an inverter 511b. Insulating circuit 512 is an insulating transformer including coils 512a and 512b.

Referring again to FIG. 10, when AC power is input to AC plug 502, AC/DC conversion (conversion from AC to DC) is performed by above-described power conversion circuit 510. As a result, DC power is generated and the generated DC power is output to DC connector 503.

A wireless tag ID2 (e.g., an IC tag of RFID) is attached to a prescribed portion (e.g., control box 501) of AC/DC conversion cable 500. Wireless tag ID2 is the same as wireless tag ID1, except that wireless tag ID2 sends out different ID information. Through wireless communication with wireless tag ID2, controller 231 (FIGS. 1 and 2) can determine whether or not AC/DC conversion cable 500 is present in the target vehicle. Furthermore, when AC/DC conversion cable 500 is present in the target vehicle, controller 231 can specify (detect) a position of AC/DC conversion cable 500 in the target vehicle through wireless communication with wireless tag ID2.

Figure 12:
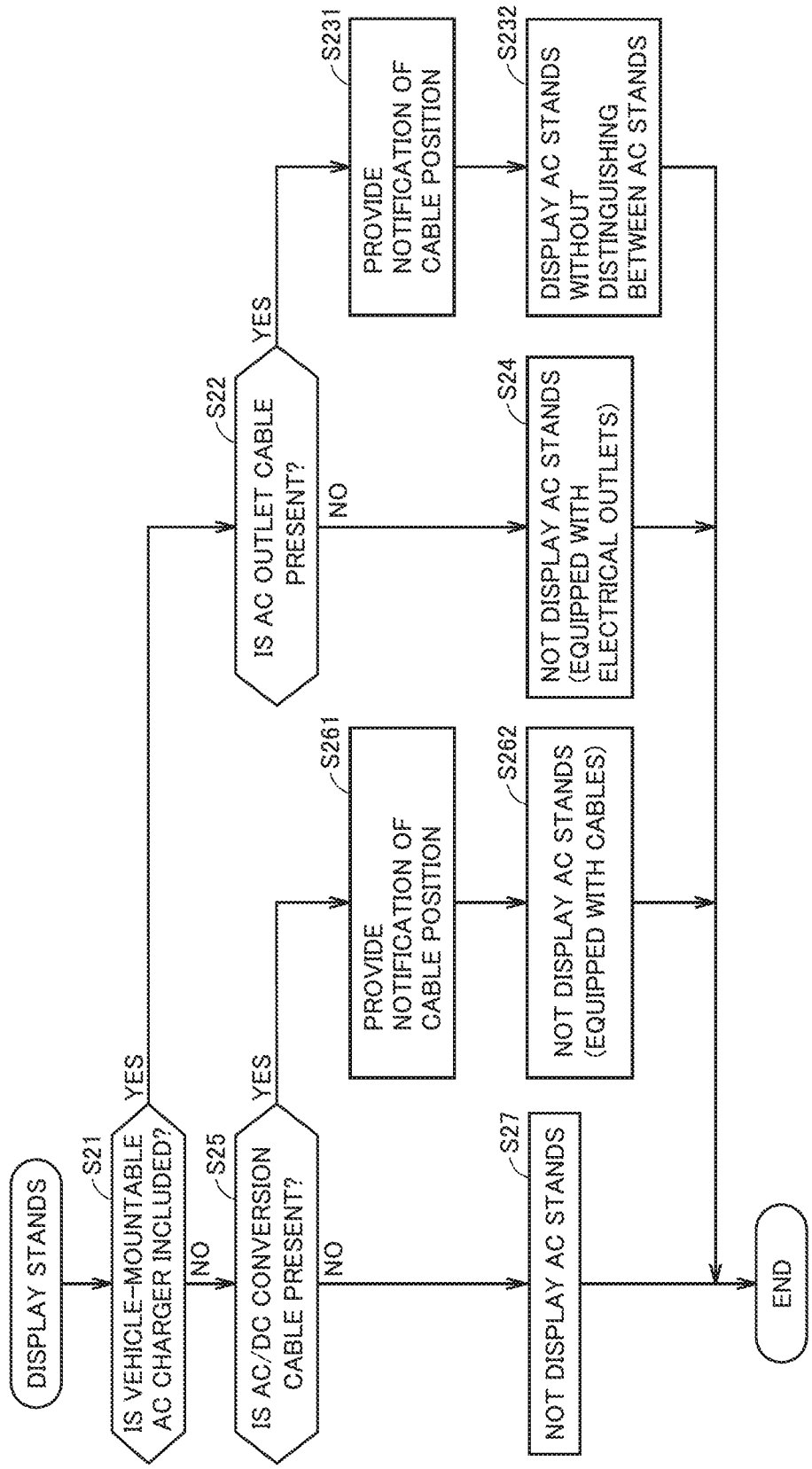
FIG. 12 is a flowchart showing a process procedure for display control executed by an information providing apparatus according to the third embodiment.

Navigation system 230 according to the third embodiment performs a process in FIG. 12, instead of the process in FIG. 3. FIG. 12 is a flowchart showing a process procedure for display control executed by controller 231 of navigation system 230 according to the third embodiment.

Referring to FIG. 12 together with FIGS. 1 and 2, in S21, controller 231 determines whether or not the target vehicle includes AC charger 20 (vehicle-mountable AC charger). S21 is the same as S11 in FIG. 3.

When it is determined in S21 that the target vehicle includes AC charger 20 (YES in S21), controller 231 determines in S22 whether or not AC outlet cable 400 (FIG. 9) is present in the target vehicle (vehicle 200B), through wireless communication with wireless tag ID1 (FIG. 9). When it is determined in S22 that AC outlet cable 400 is present in the target vehicle (YES in S22), the process proceeds to S231. The determination of YES in S22 means that the second condition is satisfied.

In S231, controller 231 detects a position of AC outlet cable 400 in the target vehicle (vehicle 200B) through wireless communication with wireless tag ID1, and causes navigation display 232 to provide a notification of the detected position of AC outlet cable 400. Any method may be used as a notification method and the user may be notified with voice. However, in the present embodiment, controller 231 causes navigation display 232 to display the position of AC outlet cable 400.

Figure 13:
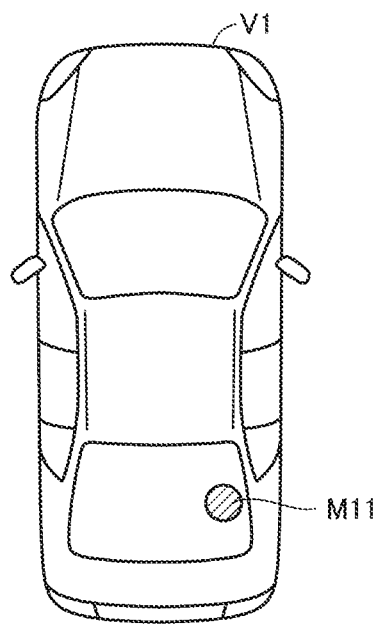
FIG. 13 shows an example of an image for notifying a user of a position of the AC outlet cable in the process in FIG. 12.

FIG. 13 shows an example of an image for notifying the user of the position of AC outlet cable 400. Referring to FIG. 13, a mark M11 displayed on a vehicle image V1 indicates the position of AC outlet cable 400. In the example in FIG. 13, mark M11 indicates that AC outlet cable 400 is located in a luggage room in a rear part of the vehicle.

Referring again to FIG. 12, after the processing in S231, controller 231 controls navigation display 232 to display the electrical outlet-type AC stands and the cable-equipped AC stands on the map without distinguishing between the electrical outlet-type AC stands and the cable-equipped AC stands in S232. S232 is the same as S12 in FIG. 3. For example, the map shown in FIG. 5 is displayed on the screen of navigation display 232.

The timing of providing the notification of the position of AC outlet cable 400 can be arbitrarily set, as long as the timing is after the determination of YES is made in S22. For example, the above-described notification may be provided when the target vehicle (vehicle 200B) stops near an electrical outlet-type AC stand.

When it is determined in S22 that AC outlet cable 400 is not present in the target vehicle (NO in S22), the process proceeds to S24. The determination of NO in S22 means that the second condition is not satisfied.

In S24, controller 231 controls navigation display 232 to display the cable-equipped AC stands of the AC stands on the map and not to display the electrical outlet-type AC stands of the AC stands on the map.

Figure 14:
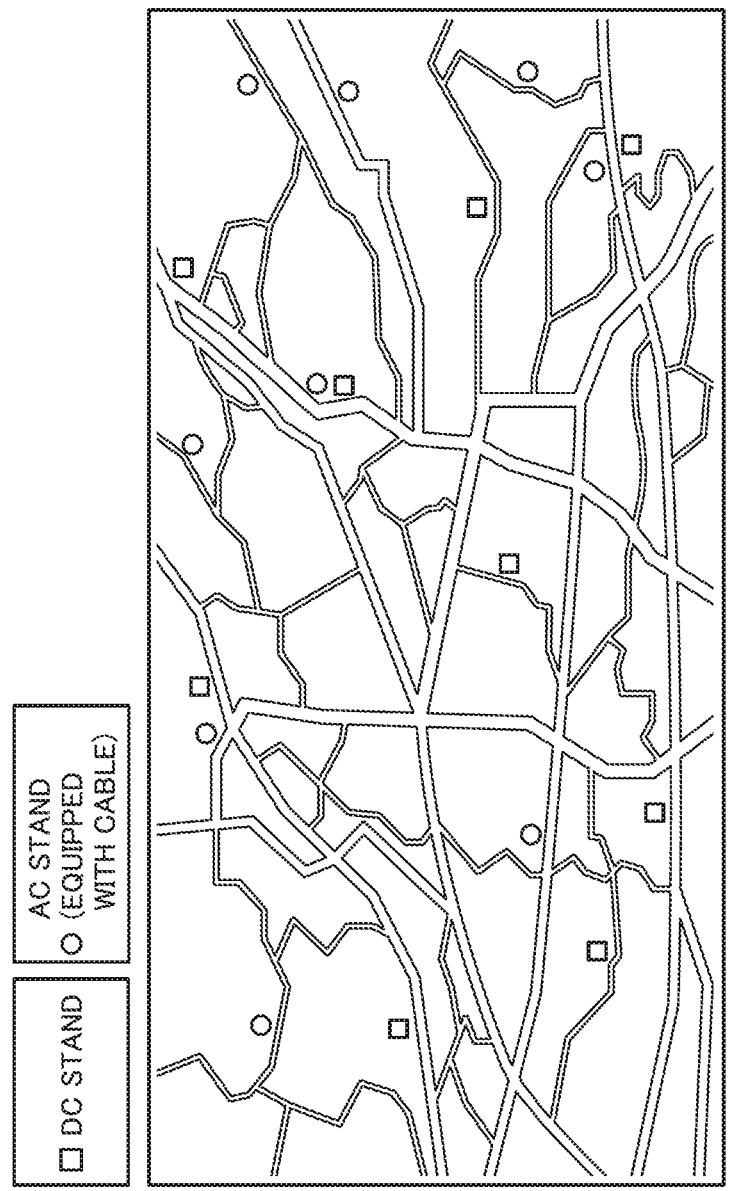
FIG. 14 shows an example in which only the cable-equipped AC stands of the AC stands are displayed on the map.

FIG. 14 shows an example in which only the cable-equipped AC stands of the AC stands are displayed on the map. In FIG. 14, "AC stand (equipped with cable)" refers to the cable-equipped AC stand. The map in FIG. 14 is a map at the same location as that of the map in each of FIGS. 4 and 5 described above.

Referring to FIG. 14, on this map, each DC stand is indicated by a square mark, and each cable-equipped AC stand is indicated by a circular mark. However, on this map, no electrical outlet-type AC stand is displayed. As a result of the processing in S24, the map shown in FIG. 14 is, for example, displayed on the screen of navigation display 232.

Referring again to FIG. 12, when it is determined in S21 that the target vehicle does not include AC charger 20 (NO in S21), controller 231 determines in S25 whether or not AC/DC conversion cable 500 (FIG. 10) is present in the target vehicle (vehicle 200A), through wireless communication with wireless tag ID2 (FIG. 10). When it is determined in S25 that AC/DC conversion cable 500 is present in the target vehicle (YES in S25), the process proceeds to S261. The determination of YES in S25 means that the first condition is satisfied.

In S261, controller 231 detects a position of AC/DC conversion cable 500 in the target vehicle (vehicle 200A) through wireless communication with wireless tag ID2, and causes navigation display 232 to provide a notification of the detected position of AC/DC conversion cable 500. Any method may be used as a notification method and the user may be notified with voice. However, in the present embodiment, controller 231 causes navigation display 232 to display the position of AC/DC conversion cable 500.

Figure 15:
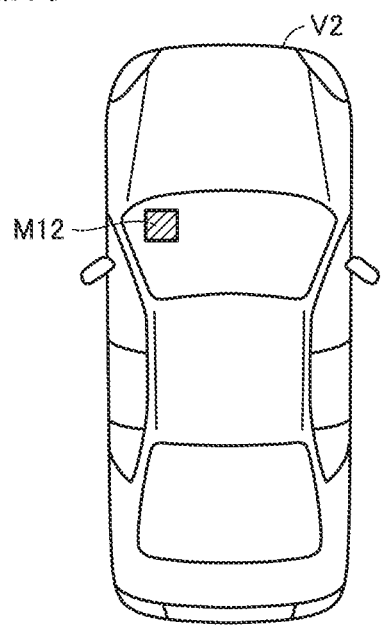
FIG. 15 shows an example of an image for notifying the user of a position of the AC/DC conversion cable in the process in FIG. 12.

FIG. 15 shows an example of an image for notifying the user of the position of AC/DC conversion cable 500. Referring to FIG. 15, a mark M12 displayed on a vehicle image V2 indicates the position of AC/DC conversion cable 500. In the example in FIG. 15, mark M12 indicates that AC/DC conversion cable 500 is located near a front seat.

Referring again to FIG. 12, after the processing in S261, controller 231 controls navigation display 232 to display the electrical outlet-type AC stands of the AC stands on the map and not to display the cable-equipped AC stands of the AC stands on the map in S262.

Figure 16:
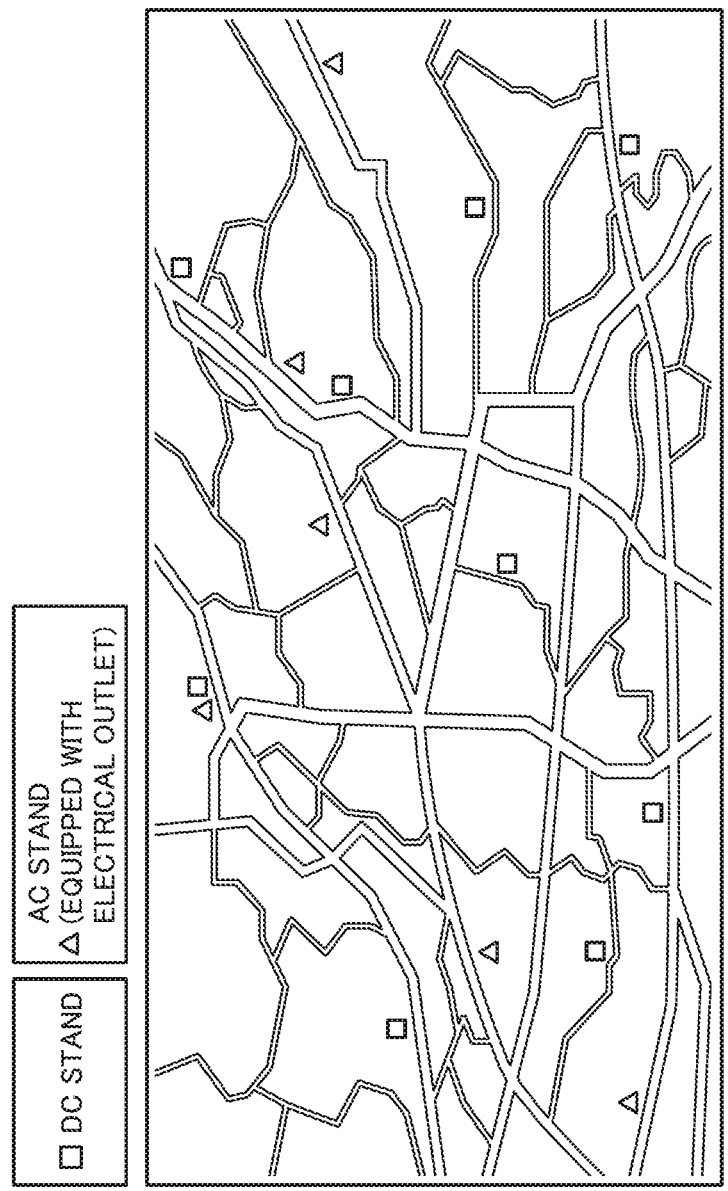
FIG. 16 shows an example in which only the electrical outlet-type AC stands of the AC stands are displayed on the map.

FIG. 16 shows an example in which only the electrical outlet-type AC stands of the AC stands are displayed on the map. In FIG. 16, "AC stand (equipped with electrical outlet)" refers to the electrical outlet-type AC stand. The map in FIG. 16 is a map at the same location as that of the map in each of FIGS. 4 and 5 described above.

Referring to FIG. 16, on this map, each DC stand is indicated by a square mark, and each electrical outlet-type AC stand is indicated by a triangular mark. However, on this map, no cable-equipped AC stand is displayed. As a result of the processing in S262, the map shown in FIG. 16 is, for example, displayed on the screen of navigation display 232.

The timing of providing the notification of the position of AC/DC conversion cable 500 can be arbitrarily set, as long as the timing is after the determination of YES is made in S25. For example, the above-described notification may be provided when the target vehicle (vehicle 200A) stops near an electrical outlet-type AC stand.

Referring again to FIG. 12, when it is determined in S25 that AC/DC conversion cable 500 is not present in the target vehicle (NO in S25), the process proceeds to S27. The determination of NO in S25 means that the first condition is not satisfied.

In S27, controller 231 controls navigation display 232 not to display all of the AC stands on the map and to display the power feeding facilities other than the AC stands on the map.

Figure 17:
FIG. 17 shows an example in which only the power feeding facilities other than the AC stands are displayed on the map.

FIG. 17 shows an example in which only the power feeding facilities (more particularly, the DC stands) other than the AC stands are displayed on the map. The map in FIG. 17 is a map at the same location as that of the map in each of FIGS. 4 and 5 described above. Referring to FIG. 17, on this map, each DC stand is indicated by a square mark. However, on this map, no AC stand is displayed. As a result of the processing in S27, the map shown in FIG. 17 is, for example, displayed on the screen of navigation display 232.

As described above, in navigation system 230 according to the present embodiment, controller 231 includes a first determination unit (S25 in FIG. 12) configured to determine whether or not AC/DC conversion cable 500 is mounted on the target vehicle. When the first determination unit determines that AC/DC conversion cable 500 is mounted on the target vehicle (YES in S25), the first condition is satisfied.

In navigation system 230, the first display unit of controller 231 is configured to control navigation display 232 not to display all of the AC stands on the map (S27 in FIG. 12, and FIG. 17), when the target vehicle is vehicle 200A and the above-described first condition is not satisfied (NO in both S21 and S25). The AC stands are not displayed on the map when the target vehicle is the non-AC vehicle (i.e., a vehicle not including AC charging module U2 and AC/DC conversion cable 500), which inhibits the target vehicle from heading for an unusable power feeding facility. In addition, in navigation system 230, the first display unit of controller 231 is configured to control navigation display 232 to display the electrical outlet-type AC stands of the AC stands on the map and not to display the cable-equipped AC stands of the AC stands on the map (S262 in FIG. 12, and FIG. 16), when the target vehicle is vehicle 200A and the above-described first condition is satisfied (NO in S21 and YES in S25). As a result, when the target vehicle is the conversion-type AC vehicle (i.e., a vehicle not including AC charging module U2 and including AC/DC conversion cable 500), the target vehicle can be guided to an electrical outlet-type AC stand. Furthermore, in navigation system 230, controller 231 further includes a first notification unit (S261 in FIG. 12, and FIG. 15) configured to detect the position of AC/DC conversion cable 500 in the target vehicle and cause navigation display 232 to provide the notification of the detected position of AC/DC conversion cable 500, when the above-described first condition is satisfied (YES in S25). As a result, the user's time and effort required to look for AC/DC conversion cable 500 can be reduced.

In navigation system 230 according to the present embodiment, controller 231 includes a second determination unit (S22 in FIG. 12) configured to determine whether or not AC outlet cable 400 is mounted on the target vehicle. When the second determination unit determines that AC outlet cable 400 is mounted on the target vehicle (YES in S22), the second condition is satisfied.

In navigation system 230, the second display unit of controller 231 is configured to control navigation display 232 to display the electrical outlet-type AC stands and the cable-equipped AC stands on the map without distinguishing between the electrical outlet-type AC stands and the cable-equipped AC stands (S232 in FIG. 12), when the target vehicle is vehicle 200B and the above-described second condition is satisfied (YES in both S21 and S22). As a result, the user can easily identify the AC stands on the map.

In navigation system 230, the second display unit of controller 231 is configured to control navigation display 232 to display the cable-equipped AC stands of the AC stands on the map and not to display the electrical outlet-type AC stands of the AC stands on the map (S24 in FIG. 12, and FIG. 14), when the target vehicle is vehicle 200B and the above-described second condition is not satisfied (YES in S21 and NO in S22).

Although the AC outlet cable is easily available and is highly possibly provided in the target vehicle, there is a non-zero possibility that the AC outlet cable is not provided in the target vehicle. For example, the user may bring out the AC outlet cable from the target vehicle and forget to return the AC outlet cable to the target vehicle. Accordingly, in navigation system 230 according to the present embodiment, the second determination unit of controller 231 determines whether or not AC outlet cable 400 is mounted on vehicle 200B, and when AC outlet cable 400 is not mounted on vehicle 200B, the second display unit of controller 231 controls navigation display 232 to display the cable-equipped AC stands on the map and not to display the electrical outlet-type AC stands on the map. With such a configuration, when the target vehicle is a vehicle not adapted to an AC outlet (i.e., a vehicle including AC charging module U2 and not including AC outlet cable 400), the target vehicle can be guided to a cable-equipped AC stand.

In navigation system 230, controller 231 further includes a second notification unit (S231 in FIG. 12, and FIG. 13) configured to detect the position of AC outlet cable 400 in the target vehicle and cause navigation display 232 to provide the notification of the detected position of AC outlet cable 400, when the above-described second condition is satisfied (YES in S22). As a result, the user's time and effort required to look for AC outlet cable 400 can be reduced.

In the above-described embodiment, "first display unit", "second display unit", "first determination unit", "second determination unit". "first notification unit", and "second notification unit" according to the present disclosure are implemented by processor 231a and the program executed by processor 231a. However, each of these units may be implemented by dedicated hardware (electronic circuit).

OTHER EMBODIMENTS

Figure 18:
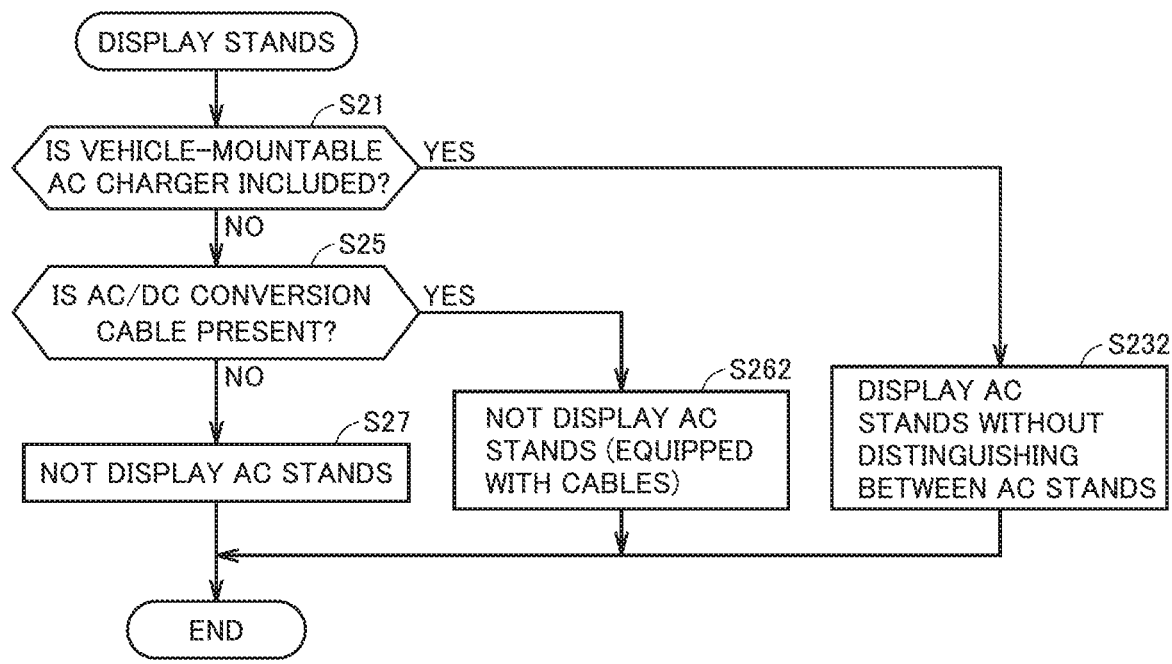
FIG. 18 shows a modification of the process in FIG. 12.

In the process in FIG. 12, at least one of the notification of the position of AC outlet cable 400 (S231) and the notification of the position of AC/DC conversion cable 500 (S261) may be omitted. The determination as to whether or not AC outlet cable 400 is present in the target vehicle (S22) may also be omitted. FIG. 18 shows a modification of the process in FIG. 12. In the process in FIG. 18, S22, S231, S24, and S261 in the process in FIG. 12 are omitted, and when the determination of YES is made in S21, the process proceeds to S232.

The first charging cable and the second charging cable are not limited to AC/DC conversion cable 500 shown in FIG. 10 and AC outlet cable 400 shown in FIG. 9, respectively. For example, the second charging cable may be a charging cable that does not include CCID box 401 in AC outlet cable 400. In addition, the configuration of the power conversion circuit included in the first charging cable is not limited to the configuration shown in FIG. 11. For example, a rectifier circuit that does not include an insulating circuit may be used as the above-described power conversion circuit. The above-described power conversion circuit may also be a bidirectional inverter.

In the example in FIG. 4, the first display unit of controller 231 is configured to display the electrical outlet-type AC stands and the cable-equipped AC stands on the same map in the manner of distinguishing between the electrical outlet-type AC stands and the cable-equipped AC stands. However, the present disclosure is not limited to such a configuration. The first display unit may be configured to display the electrical outlet-type AC stands and the cable-equipped AC stands on different maps, to thereby display the electrical outlet-type AC stands on the map in the manner of being distinguished from the cable-equipped AC stands.

Figure 19:
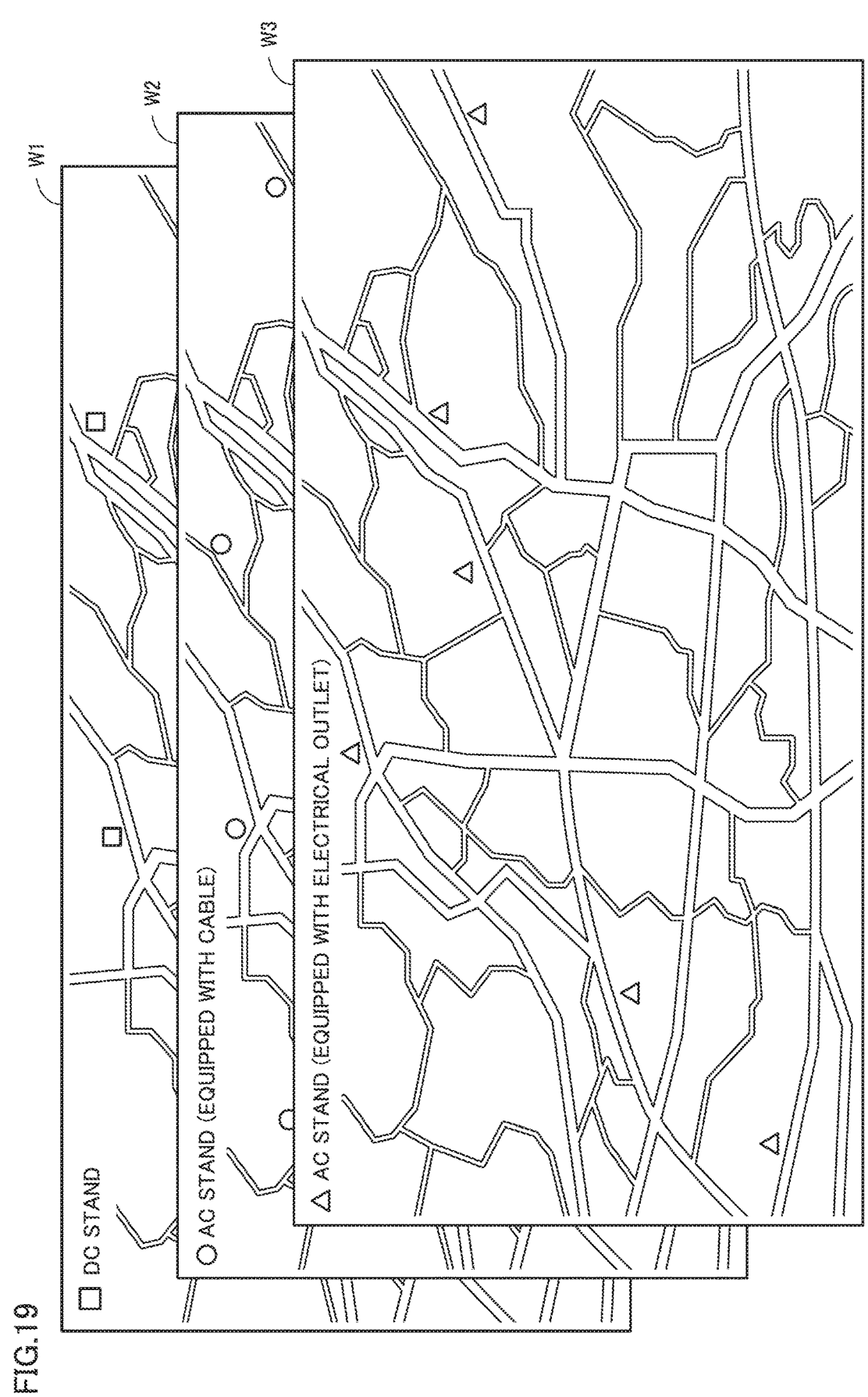
FIG. 19 shows an example in which the electrical outlet-type AC stands and the cable-equipped AC stands are displayed on different maps.

FIG. 19 shows an example in which the electrical outlet-type AC stands and the cable-equipped AC stands are displayed on different maps. Referring to FIG. 19, a map at the same location is displayed in each of windows W1 to W3. However, only the DC stands are displayed on the map in window W1, only the cable-equipped AC stands are displayed on the map in window W2, and only the electrical outlet-type AC stands are displayed on the map in window W3. FIG. 19 shows a state in which window W3 is arranged in the forefront and windows W1 and W2 are hidden behind window W3. However, the user can arbitrarily select which window is arranged at the front. For example, a window (any one of windows W1 to W3) selected by the user through the GUI may be arranged at the front.

In each of the above-described embodiments, each of the first display unit and the second display unit of controller 231 is configured to display all of the DC stands on the map without distinguishing between the DC stands. In addition, the first display unit of controller 231 is configured to divide the AC stands displayed on the map into two classifications (i.e., the electrical outlet-type AC stands and the cable-equipped AC stands). However, the present disclosure is not limited to such a configuration. Each of the first display unit and the second display unit of controller 231 may be configured to display the DC stands on the map in a manner of distinguishing between the DC stands. Alternatively, the first display unit of controller 231 may be configured to divide the AC stands displayed on the map into three or more classifications.

Figure 20:
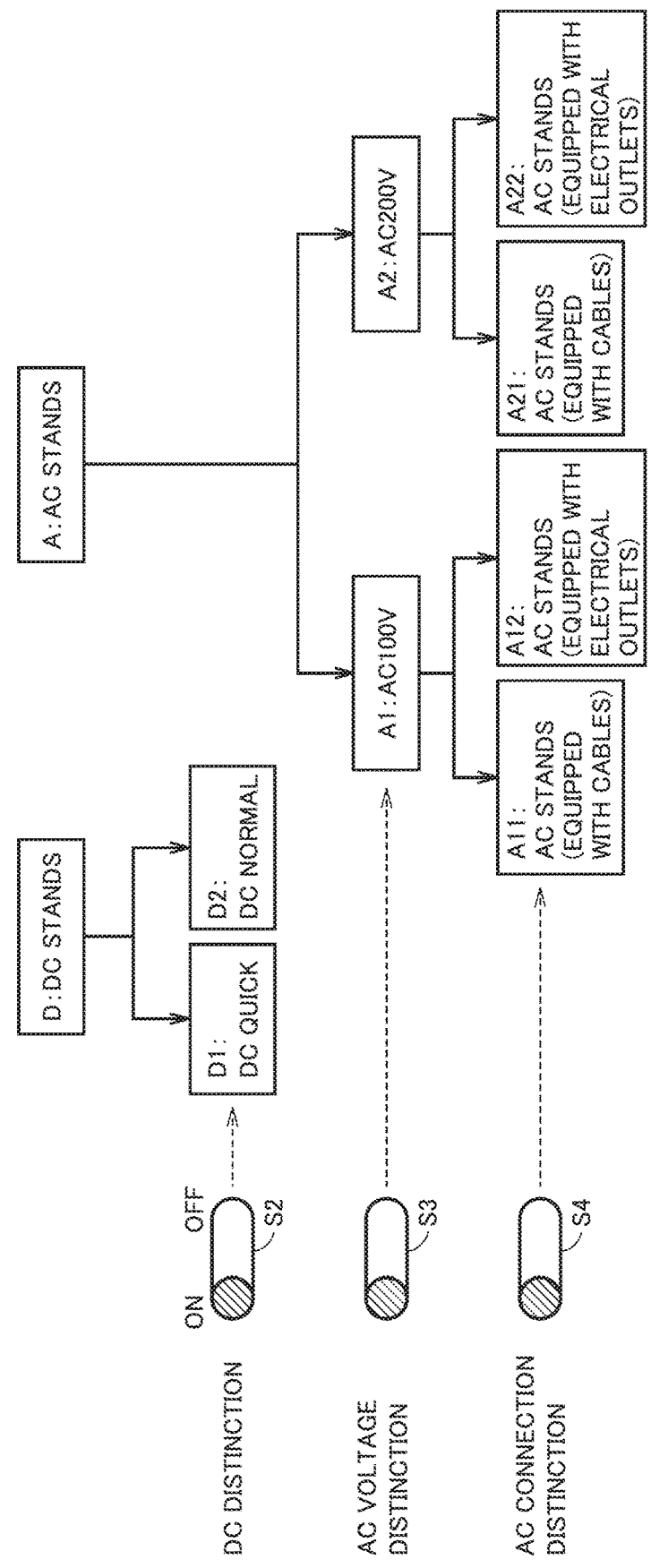
FIG. 20 shows classification of the power feeding facilities when each switch is in a first state in a modification of the second embodiment.
Figure 21:
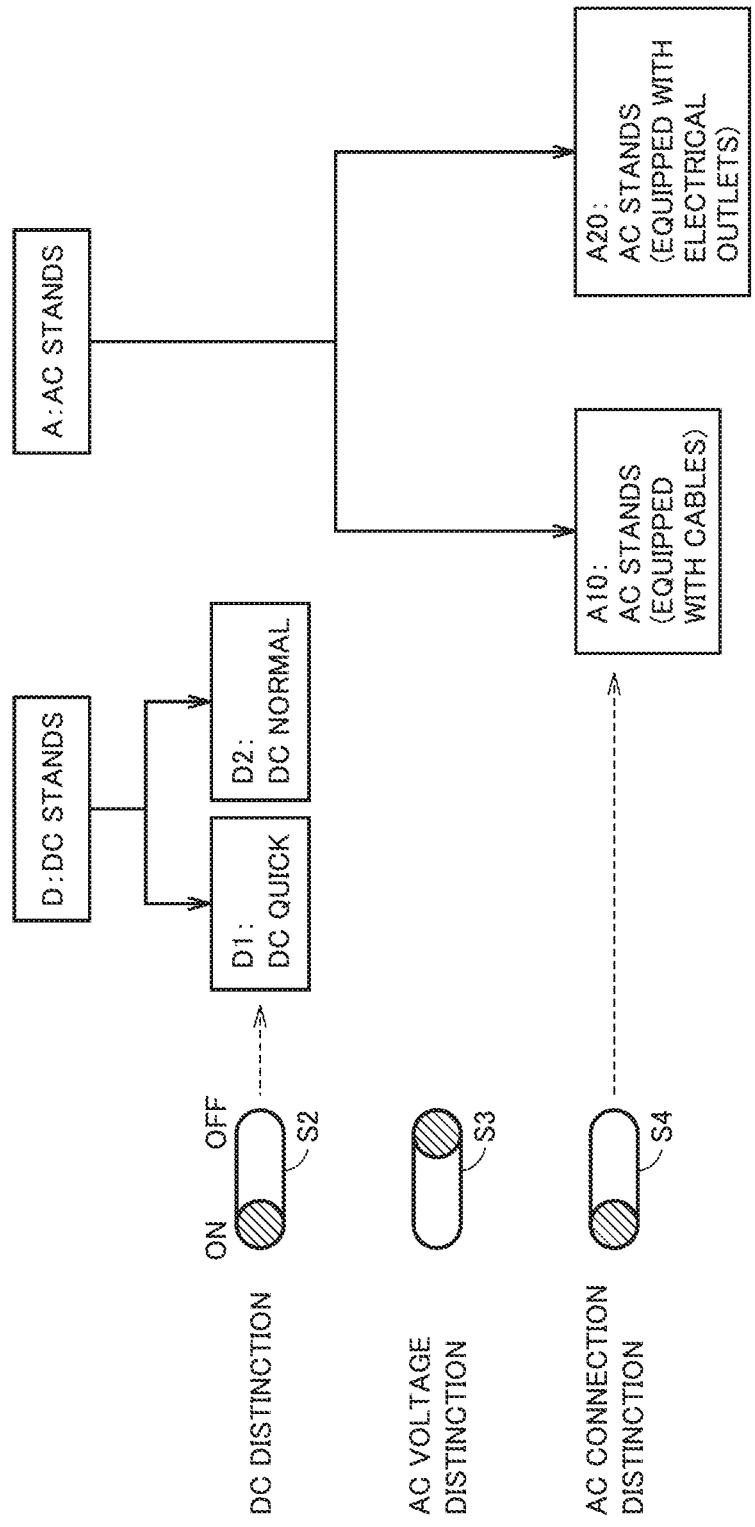
FIG. 21 shows classification of the power feeding facilities when each switch is in a second state in the modification of the second embodiment.

FIG. 20 shows classification of the power feeding facilities when each switch is in a first state (S2: ON, S3: ON, S4: ON) in a modification of the second embodiment. FIG. 21 shows classification of the power feeding facilities when each switch is in a second state (S2: ON, S3: OFF, S4: ON) in the modification of the second embodiment.

Referring to FIGS. 20 and 21, similarly to switch S1 described above (see FIGS. 6 and 7), switches S2 to S4 are switches included in input device 233 and are operated by the user.

When switch S2 is in the off state, navigation system 230 displays all of the DC stands on the map without distinguishing between the DC stands. When switch S2 is turned on, navigation system 230 displays the DC stands on the map in a manner of distinguishing between the DC stands for quick charging and the DC stands for normal charging. For example, on the map, the DC stands for quick charging are indicated by "D1", and the DC stands for normal charging are indicated by "D2".

A state of switch S4 is referenced when it is determined in the process in FIG. 8 whether or not navigation system 230 is in "AC distinction ON". Controller 231 makes the determination of YES in S10 when switch S4 is in the on state, and makes the determination of NO in S10 when switch S4 is in the off state.

When the determination of YES is made in S10 in the process in FIG. 8, navigation system 230 displays the power feeding facilities (more particularly, the DC stands and the AC stands) on the map in the manner of distinguishing between the electrical outlet-type AC stands and the cable-equipped AC stands in S13. At this time, when switch S3 is also in the on state in addition to switch S4 as shown in FIG. 20, the AC stands on the map are distinguished by voltage. In this case, the AC stands on the map are divided into four classifications. For example, on the map, each cable-equipped AC stand having a voltage of 100 V is indicated by "A11", each electrical outlet-type AC stand having a voltage of 100 V is indicated by "A12", each cable-equipped AC stand having a voltage of 200 V is indicated by "A21", and each electrical outlet-type AC stand having a voltage of 200 V is indicated by "A22". In contrast, when switch S3 is in the off state as shown in FIG. 21, the AC stands on the map are not distinguished by voltage. In this case, the AC stands on the map are divided into two classifications. For example, on the map, each cable-equipped AC stand is indicated by "A10", and each electrical outlet-type AC stand is indicated by "A20". Switch S3 is effective only when switch S4 is in the on state.

Figure 22:
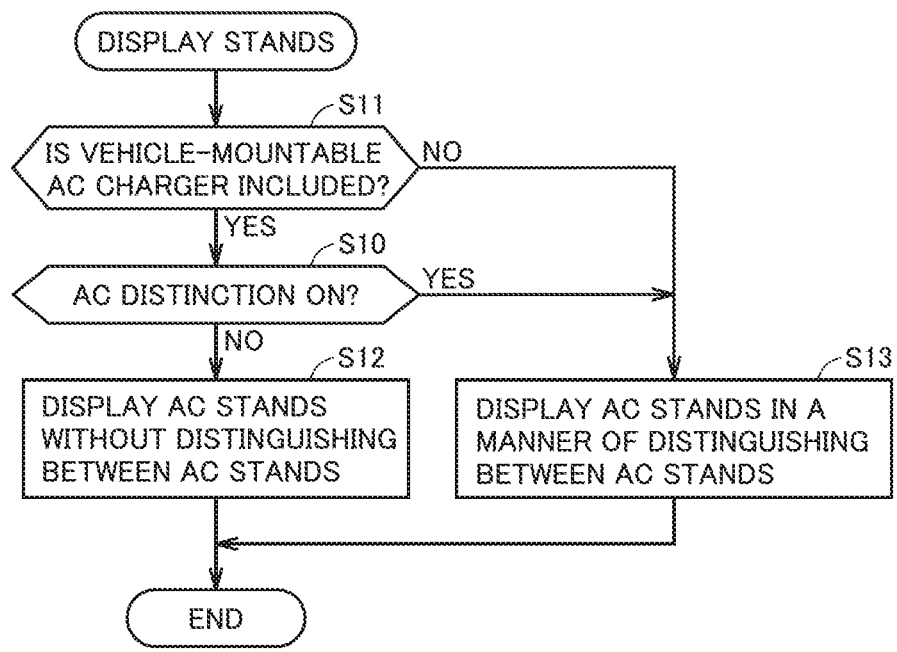
FIG. 22 shows a modification of the process in FIG. 8.

In the information providing apparatus configured to display the electrical outlet-type AC stands and the cable-equipped AC stands on the map without distinguishing between the electrical outlet-type AC stands and the cable-equipped AC stands, when the target vehicle is vehicle 200B and the prescribed second condition is satisfied, the second condition may be satisfied when input device 233 receives a prescribed second input. FIG. 22 shows a modification of the process in FIG. 8.

Referring to FIG. 22, in this example, when it is determined in S11 that the target vehicle does not include AC charger 20 (NO in S11), the processing in S13 is performed. In contrast, when it is determined in S11 that the target vehicle includes AC charger 20 (YES in S11), the processing in S10 is performed. S10 to S13 in the process in FIG. 22 are the same as S10 to S13 in FIG. 8, respectively.

When the determination of YES is made in S10, navigation system 230 displays the electrical outlet-type AC stands on the map in the manner of being distinguished from the cable-equipped AC stands in S13. The determination of YES in S10 means that the second condition is not satisfied. In contrast, when the determination of NO is made in S10, navigation system 230 displays the electrical outlet-type AC stands and the cable-equipped AC stands on the map without distinguishing between the electrical outlet-type AC stands and the cable-equipped AC stands in S12. The determination of NO in S10 means that the second condition is satisfied. In this example, turning off switch S1 (FIGS. 6 and 7) corresponds to one example of "second input" according to the present disclosure.

It is not essential to mount the information providing apparatus on the navigation system. The information providing apparatus may be implemented by vehicle ECU 50 and meter panel 220, or may be mounted on a mobile device such as a smartphone.

Although the vehicle having the information providing apparatus mounted thereon is the target vehicle in each of the above-described embodiments, the present disclosure is not limited thereto. When the information providing apparatus is mounted on a mobile device, an arbitrary vehicle may be set as the target vehicle in the information providing apparatus. The information providing apparatus in which the target vehicle is set provides information about the target vehicle (e.g., information useful for the target vehicle).

In the information providing apparatus according to each of the above-described embodiments, controller 231 includes the third determination unit configured to determine whether or not the AC charger is mounted on the target vehicle, and after the information providing apparatus is mounted on the target vehicle, the third determination unit determines whether or not the AC charger is mounted on the target vehicle. However, the present disclosure is not limited to such a configuration. Information indicating whether or not the AC charger is mounted on the target vehicle may be input to the above-described information providing apparatus by default setting (e.g., setting at the time of factory shipment). In the information providing apparatus having such default setting, the determination as to whether or not the AC charger is mounted on the target vehicle (e.g., S11 in FIG. 3 or S21 in FIG. 12) can be omitted.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. An information providing apparatus configured to be used in a target vehicle and display power feeding facilities on a map, the target vehicle including a battery configured to be charged with DC power supplied from outside the target vehicle, the information providing apparatus comprising:
    a controller configured to cause a display device to display the map,
    the controller including:
    a first display unit configured to control the display device to display a first AC power feeding facility on the map in a manner of being distinguished from a second AC power feeding facility, when the target vehicle is a first vehicle; and
    a second display unit configured to control the display device to display the first AC power feeding facility and the second AC power feeding facility on the map without distinguishing between the first AC power feeding facility and the second AC power feeding facility, when the target vehicle is a second vehicle,
    the first vehicle being a vehicle not including an AC charger,
    the second vehicle being a vehicle including an AC charger,
    the AC charger being a vehicle-mountable charger configured to convert AC power supplied from outside the target vehicle into DC power and supply the DC power to the battery when the target vehicle is the second vehicle,
    the first AC power feeding facility being an AC power feeding facility including an electrical outlet for AC power connectable to a plug of a charging cable,
    the second AC power feeding facility being an AC power feeding facility including a charging cable connectable to an inlet for AC power of a vehicle,
    wherein the first display unit controls the display device to display the first AC power feeding facility and the second AC power feeding facility in the manner that the first AC power feeding facility and the second AC power feeding facility are displayed on different maps.

2. The information providing apparatus according to claim 1, wherein the first display unit controls the display device to display the first AC power feeding facility and the second AC power feeding facility in the manner that different visual designators are used for the first AC power feeding facility and the second AC power feeding facility.

3. The information providing apparatus according to claim 1, wherein the controller further includes:
    a first determination unit configured to determine whether or not a first charging cable is mounted on the target vehicle, and
    a second determination unit configured to determine whether or not a second charging cable is mounted on the target vehicle,
    wherein the first charging cable includes:
        an AC plug connectable to the electrical outlet for AC power;
        a DC connector connectable to an inlet for DC power of a vehicle; and
        a power conversion circuit configured to convert AC power input from the AC plug side into DC power and output the DC power to the DC connector side,
    a prescribed first condition is satisfied when the first determination unit determines that the first charging cable is mounted on the target vehicle,
    the prescribed first condition is not satisfied when the first determination unit determines that the first charging cable is not mounted on the target vehicle,
    the first display unit is configured to control the display device not to display all of the AC power feeding facilities on the map, when the target vehicle is the first vehicle and the prescribed first condition is not satisfied,
    the second charging cable includes:
        an AC plug connectable to the electrical outlet for AC power; and
        an AC connector connectable to the inlet for AC power of a vehicle,
    a prescribed second condition is satisfied when the second determination unit determines that the second charging cable is mounted on the target vehicle,
    the prescribed second condition is not satisfied when the second determination unit determines that the second charging cable is not mounted on the target vehicle,
    the first charging cable is an AC outlet cable, and
    the second charging cable is an AC outlet cable.

4. The information providing apparatus according to claim 1, wherein the controller further includes:
    a first notification unit configured to detect a position of a first charging cable in the target vehicle and cause the display device or another notification device to provide a notification of the detected position of the first charging cable, when the target vehicle stops near the first AC power feeding facility after a prescribed first condition is satisfied when a first determination unit determines that the first charging cable is mounted on the target vehicle.

5. The information providing apparatus according to claim 1, wherein the controller further includes:
    a second notification unit configured to detect a position of a second charging cable in the target vehicle and cause the display device or another notification device to provide a notification of the detected position of the second charging cable, when the target vehicle stops near the second AC power feeding facility after a prescribed second condition is satisfied when a second determination unit determines that the second charging cable is mounted on the target vehicle.

6. A vehicle comprising:
the information providing apparatus according to claim 1; and
an inlet for DC power.

* * * * *